United States Patent
Asai

(10) Patent No.: US 9,732,822 B2
(45) Date of Patent: Aug. 15, 2017

(54) GAS SPRING DEVICE, AND BALANCER DEVICE AND ACTUATOR WHICH USE GAS SPRING DEVICE

(71) Applicant: PANASONIC INTELLECTUAL PROPERTY MANAGEMENT CO., LTD., Osaka (JP)

(72) Inventor: Katsuhiko Asai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 543 days.

(21) Appl. No.: 14/264,257

(22) Filed: Apr. 29, 2014

(65) Prior Publication Data

US 2014/0231731 A1    Aug. 21, 2014

Related U.S. Application Data

(63) Continuation of application No. PCT/JP2013/004333, filed on Jul. 16, 2013.

(30) Foreign Application Priority Data

Jul. 18, 2012  (JP) .................... 2012-159662

(51) Int. Cl.
*B66D 1/08* (2006.01)
*F16F 15/023* (2006.01)
*B66D 3/18* (2006.01)

(52) U.S. Cl.
CPC ............ *F16F 15/0232* (2013.01); *B66D 1/08* (2013.01); *B66D 3/18* (2013.01);
(Continued)

(58) Field of Classification Search
CPC .... B66D 1/08; B66D 3/18; B66D 3/20; F16F 15/0232; F16F 2230/0011; F16F 2230/0064; Y10T 16/84
See application file for complete search history.

(56) References Cited

U.S. PATENT DOCUMENTS 3,213,763 A * 10/1965 Pearson ............ B66D 1/08
418/26
3,259,351 A *  7/1966 Olsen ............ B25H 1/0028
248/325

(Continued)

FOREIGN PATENT DOCUMENTS

JP       7-232900       9/1995
JP       8-239200       9/1996

(Continued)

OTHER PUBLICATIONS

Notification of Transmittal of Translation of the International Preliminary Report on Patentability and Written Opinion issued Jan. 29, 2015 in International (PCT) Application No. PCT/JP2013/004333.

(Continued)

*Primary Examiner* — Emmanuel M Marcelo
(74) *Attorney, Agent, or Firm* — Wenderoth, Lind & Ponack, L.L.P.

(57) ABSTRACT

A gas spring device includes a gas spring which generates a force proportional to a differential pressure between an inner space pressure and an atmospheric pressure, a suction/discharge part which can adjust a gas amount in the gas spring inner space, a rotary body which is connected to the gas spring, to which a torque due to the force generated by the spring is applied, a displacement part which is connected to the rotary body, and is displaced in conjunction with a rotary body rotary movement, a speed change part which is arranged in one of or both of between the rotary body and the displacement part and between the gas spring and the rotary body, and a torque compensating part which sets the torque applied to the rotary body to substantially 0 when the inner space gas amount of the gas spring is at a predetermined value.

15 Claims, 13 Drawing Sheets

(52) U.S. Cl.
CPC ............... *F16F 2230/0011* (2013.01); *F16F 2230/0064* (2013.01); *Y10T 16/84* (2015.01)

(56) References Cited

U.S. PATENT DOCUMENTS

| | | | | |
|---|---|---|---|---|
| 3,675,899 | A * | 7/1972 | McKendrick | B66D 3/18 254/386 |
| 3,762,777 | A * | 10/1973 | Jacob | B66D 1/08 188/170 |
| 4,665,696 | A * | 5/1987 | Rosman | B66C 19/007 254/386 |
| 6,547,220 | B2 * | 4/2003 | Johnson | B66D 1/485 254/268 |
| 7,753,344 | B1 * | 7/2010 | Moretz | B66D 1/39 254/329 |
| 2008/0061275 | A1 | 3/2008 | Stokkermans | |
| 2009/0188883 | A1 * | 7/2009 | Van Keuren, II | B66D 3/18 212/279 |

FOREIGN PATENT DOCUMENTS

| | | |
|---|---|---|
| JP | 3794743 | 7/2006 |
| JP | 2007-119249 | 5/2007 |
| JP | 2008-501595 | 1/2008 |
| JP | 4649105 | 3/2011 |

OTHER PUBLICATIONS

International Search Report (ISR) issued Oct. 22, 2013 in International (PCT) Application No. PCT/JP2013/004333.
"Catalogue of Spring Balancer", issued Apr. 2010 by Endo Kogyo Co., Ltd.

* cited by examiner

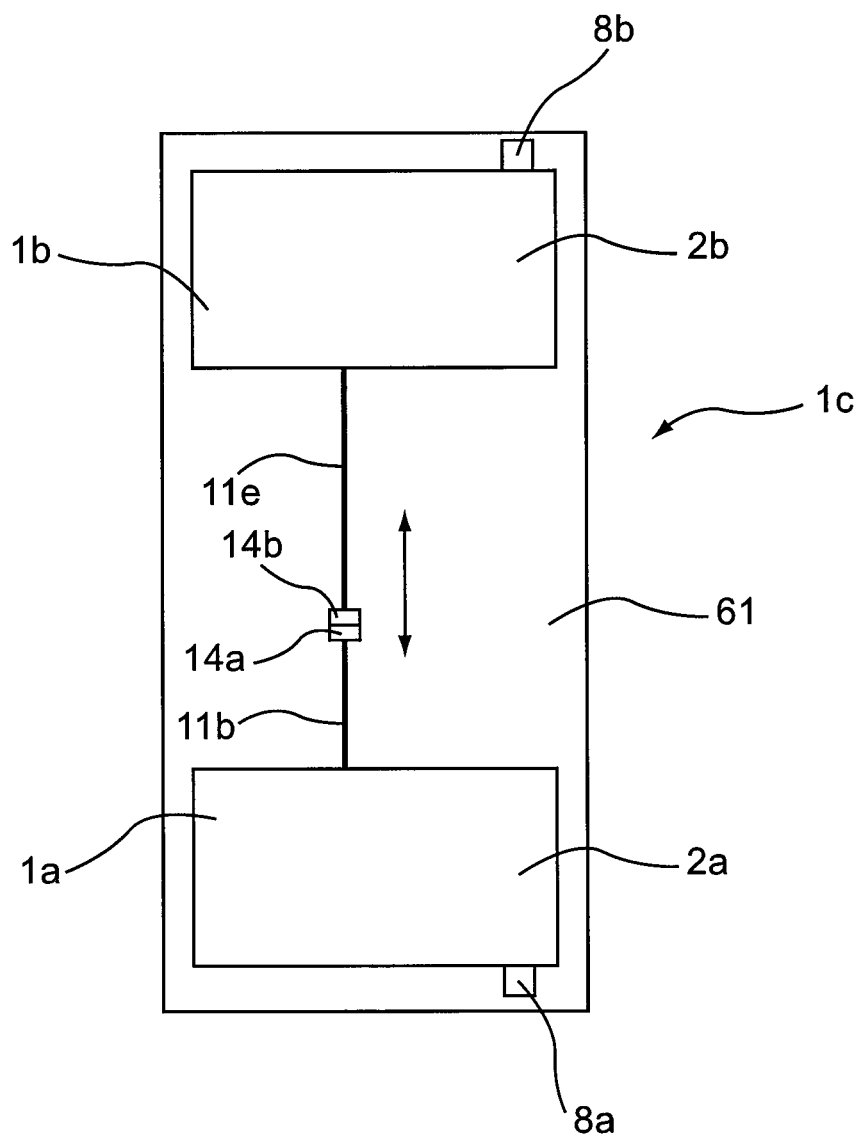

GAS SPRING DEVICE, AND BALANCER DEVICE AND ACTUATOR WHICH USE GAS SPRING DEVICE

CROSS-REFERENCE TO RELATED APPLICATIONS

This is a continuation application of International Application No. PCT/JP2013/004333, with an international filing date of Jul. 16, 2013, which claims priority of Japanese Patent Application No.: 2012-159662 filed on Jul. 18, 2012, the content of which is incorporated herein by reference.

TECHNICAL FIELD

The technical field relates to a spring device which makes use of a change in pressure of a compressed gas generated along with a shrinkage of gas, and more particularly to a gas spring device which can adjust a force generated by the spring device in a wide range by using a torque compensation device, and a balancer device and an actuator which use the gas spring device.

BACKGROUND ART

As an elastic element which is used in a balancer device or the like and can adjust its own generating force thus coping with a change in load weight, there have been known a metal spring (see, e.g., Patent Literature 1 and Non-Patent Literature 1) and an air spring (see, e.g., Patent Literature 2). There has been also proposed a method in which a generating force of an air spring which changes corresponding to a displacement is made uniform using a non-true-circular disk (see, e.g., Patent Literature 3).

CITATION LIST

Patent Literature

[Patent Literature 1] JP 2007-119249 A
[Patent Literature 2] JP 3794743 B1
[Patent Literature 3] JP 4649105 B1

Non-Patent Literature

[Non-Patent Literature 1] "Catalogue of Spring Balancer, issued in April, 2010 by Endo Kogyo Co., Ltd."

However, when a metal spring is used as an elastic element, in order to cope with a change in load weight, it is necessary to displace an elastic body to which a force balancing with the load weight is applied. Accordingly, there have been drawbacks that the metal spring cannot be adjusted easily, and an adjustment range cannot be greatly broadened due to the limitation on a tolerable strain of the spring. On the other hand, when an air spring is used as an elastic element, the air spring can easily cope with a change in load weight by adjusting an amount of air in the air spring. In the conventional configuration, however, it is necessary to perform suction/discharge of air each time a change in position occurs, thus giving rise to a drawback that an amount of consumption of air is increased. On the contrary, when a generating force of the air spring is made uniform by a non-true-circular disk for suppressing the consumption of air, there arises a drawback that the air spring can cope with only a specific load weight.

SUMMARY OF THE INVENTION

One non-limiting and exemplary embodiment provides a gas spring device, a balancer device, and an actuator which use the gas spring device, each of which can easily cope with a change in load weight in a wide range and in which suction/discharge of a gas associated with a change in position of a load is unnecessary.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature: A gas spring device comprising:

a gas spring that is fixed to a frame, and generates a force proportional to a differential pressure between a pressure in an inner space and an atmospheric pressure;

a suction/discharge part that is arranged in the gas spring, and is capable of adjusting an amount of gas in the inner space of the gas spring;

a rotary body that is rotatably arranged in the frame and connected to the gas spring, to which a torque due to the force generated by the gas spring is applied;

a displacement part that is connected to the rotary body, and is displaced in conjunction with a rotary movement of the rotary body;

a speed change part that is arranged in the frame, and configured to perform one or both of conversion between a torque applied to the rotary body due to a generating force of the gas spring and a force applied to the displacement part by being arranged between the rotary body and the displacement part, and conversion between a generating force of the gas spring and a torque applied to the rotary body by being arranged between the gas spring and the rotary body; and a torque compensating part that is arranged in the frame and connected to the rotary body, and sets the torque applied to the rotary body to substantially 0 when the amount of the gas in the inner space of the gas spring is at a predetermined value.

These general and specific aspects may be implemented using a system, a method, and any combination of systems and methods.

According to the above-mentioned aspects of the present invention, by applying to the rotary body the torque generated by the generating force of the gas spring and the torque generated by the torque compensating portion, the force which changes corresponding to the amount of gas in the inner space of the gas spring can be applied to the displacement portion while maintaining the characteristic (for example, a constant load) defined by the speed change part. That is, according to the above-mentioned aspects of the present invention, the generating force can be easily changed by adjusting the amount of gas in the inner space of the gas spring, and the constant force can be generated regardless of the position of the displacement portion while maintaining the amount of gas in the inner space of the gas spring constant. Accordingly, it is possible to obtain the gas spring device which can easily cope with the change in load weight in the wide range and in which suction/discharge of the gas associated with the change in position is unnecessary.

BRIEF DESCRIPTION OF THE DRAWINGS

These and other aspects and features of the present disclosure will become clear from the following description taken in conjunction with the embodiments thereof with reference to the accompanying drawings, in which:

FIG. 18 is a schematic view of a composite air spring device in a third embodiment of the present invention.

DETAILED DESCRIPTION OF THE INVENTION

Figure 1:
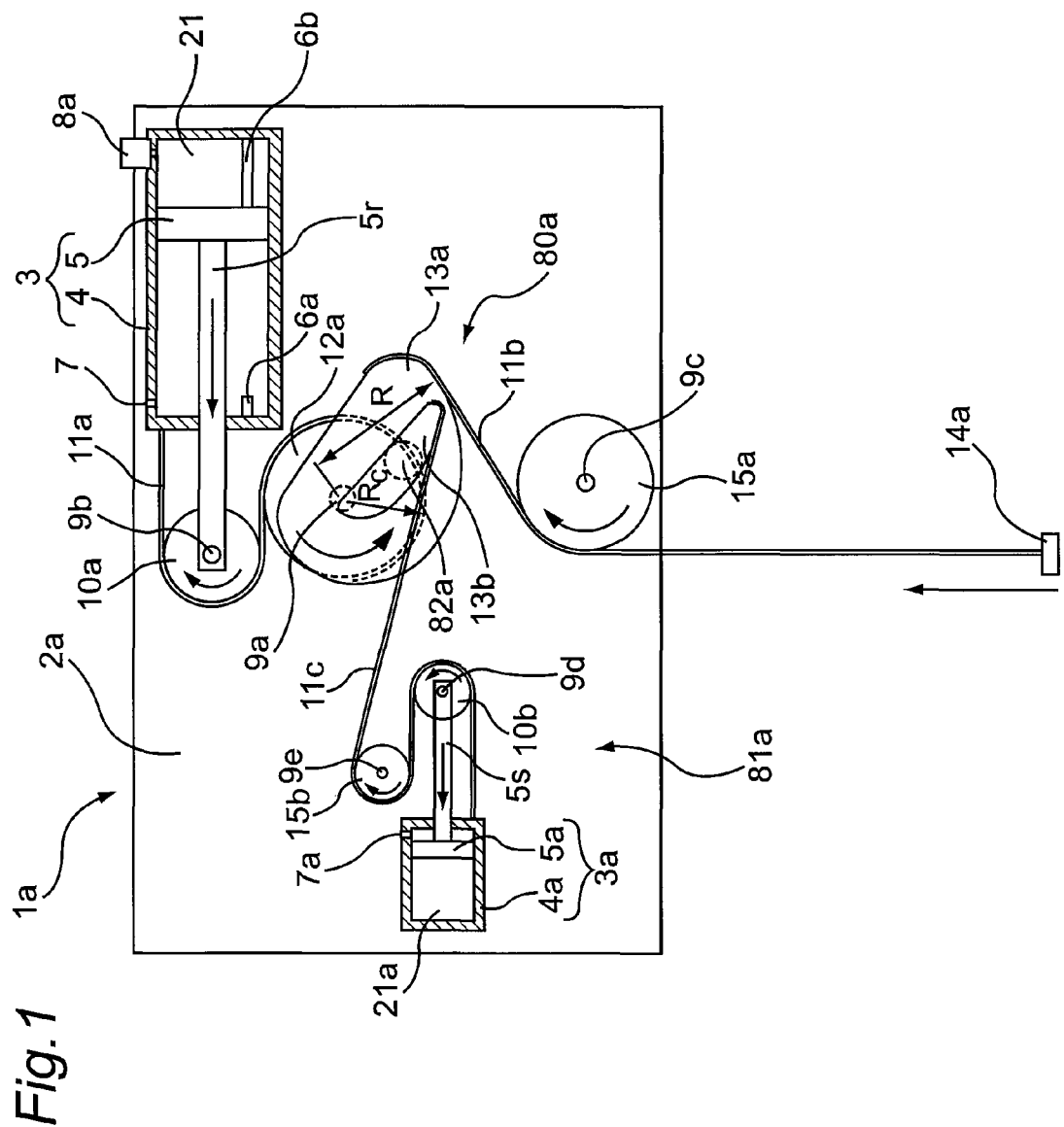
FIG. 1 is a schematic partial cross-sectional view of an air spring device according to a first embodiment of the present invention in a compressed state.

Before the description of the various embodiments proceeds, various approaches made by the inventors to accomplish the embodiments are explained.

Examples of the disclosed technique are as follows.

1st aspect: A gas spring device comprising:

a gas spring that is fixed to a frame, and generates a force proportional to a differential pressure between a pressure in an inner space and an atmospheric pressure;

a suction/discharge part that is arranged in the gas spring, and is capable of adjusting an amount of gas in the inner space of the gas spring;

a rotary body that is rotatably arranged in the frame and connected to the gas spring, to which a torque due to the force generated by the gas spring is applied;

a displacement part that is connected to the rotary body, and is displaced in conjunction with a rotary movement of the rotary body;

a speed change part that is arranged in the frame, and configured to perform one or both of conversion between a torque applied to the rotary body due to a generating force of the gas spring and a force applied to the displacement part by being arranged between the rotary body and the displacement part, and conversion between a generating force of the gas spring and a torque applied to the rotary body by being arranged between the gas spring and the rotary body; and a torque compensating part that is arranged in the frame and connected to the rotary body, and sets the torque applied to the rotary body to substantially 0 when the amount of the gas in the inner space of the gas spring is at a predetermined value.

According to the above-mentioned construction, by applying to the rotary body the torque generated by the generating force of the gas spring and the torque generated by the torque compensating portion, the force which changes corresponding to the amount of gas in the inner space of the gas spring can be applied to the displacement portion while maintaining the characteristic (for example, a constant load) defined by the speed change part. That is, according to the first aspect of the present invention, the generating force can be easily changed by adjusting the amount of gas in the inner space of the gas spring, and the constant force can be generated regardless of the position of the displacement portion while maintaining the amount of gas in the inner space of the gas spring constant.

2nd aspect: The gas spring device according to the 1st aspect, wherein the torque compensating part sets the torque applied to the rotary body to substantially 0 when the amount of the gas in the inner space of the gas spring is an amount of the gas which brings an inner pressure to an atmospheric pressure when a volume of the inner space is set to a maximum value.

With such a configuration, a torque applied to the rotary body can be set to substantially 0 when the inner space of the gas spring has a minimum amount of gas where the inner space thereof does not become a negative pressure. Hence, it is possible to obtain a gas spring device which can cope with a change in load weight in a broader range.

3rd aspect: The gas spring device according to the 1st or 2nd aspect, wherein the torque compensating part comprises:

an elastic body that is arranged in the frame;

a first flexible coupling member that is connected to the elastic body, to which a tension generated by a generating force of the elastic body is applied;

a first non-true-circular disk that is rotatably arranged in the frame, around which the first flexible coupling member is wound; and a first transmitting part that is rotatably arranged in the frame, and transmits to the rotary body a torque applied to the first non-true-circular disk by the tension of the first flexible coupling member.

With such a configuration, a characteristic required for the torque compensating part can be realized with a simple configuration. Hence, it is possible to obtain a gas spring device having stable performance.

4th aspect: The gas spring device according to the 3rd aspect, wherein the first non-true-circular disk is configured by a rotatable plate-like member having a curved side surface formed of a group of a plurality of arcs each having a different radius of curvature, and the first flexible coupling member makes contact with and is wound around the curved side surface due to rotation of the plate-like member.

With such a configuration, a torque applied to the rotary body by the torque compensating part continuously changes. Hence, it is possible to obtain a gas spring device with a smooth change in characteristic associated with a change in angle of the rotary body.

5th aspect: The gas spring device according to the 4th aspect, wherein the first non-true-circular disk is a member having a shape in which a distance $R_c$ from a center of a rotary axis of the rotary body to a center of a thickness of the first flexible coupling member is set to $R_c=2T_c/F_c$ when a rotational angle of the rotary body is $\theta$, $T_c$ is a torque which the torque compensating part applies to the rotary body at the rotational angle $\theta$, and $F_c$ is a force which is generated by the elastic body.

With such a configuration, an amount of deformation of the elastic body associated with the rotation of the rotary body can be decreased. Hence, it is possible to obtain a gas spring device with a smaller torque compensating part.

6th aspect: The gas spring device according to any one of the 1st to 5th aspects, wherein the speed change part that is arranged between the rotary body and the displacement part, comprises:

a second non-true-circular disk that is connected to the rotary body and rotates in conjunction with the rotary body; and a second flexible coupling member that has one end thereof wound around the second non-true-circular disk and an other end thereof connected to the displacement part.

With such a configuration, a characteristic required for the speed change part can be realized with a simple configuration. Hence, it is possible to obtain a gas spring device having stable performance.

7th aspect: The gas spring device according to the 6th aspect, wherein the second non-true-circular disk is configured by a rotatable plate-like member having a curved side surface formed of a group of a plurality of arcs each having a different radius of curvature, and the second flexible coupling member makes contact with is wound around the curved side surface due to rotation of the plate-like member.

With such a configuration, a generating force of the gas spring can be continuously converted by the speed change part. Hence, it is possible to obtain a gas spring device with a smooth change in characteristic associated with a change in angle of the rotary body.

8th aspect: The gas spring device according to the 7th aspect, wherein the gas spring is configured by a cylinder and a piston which moves inside the cylinder, and the second non-true-circular disk is a member formed in a shape in which a distance R from a center of a rotary axis of the rotary body to a center of a thickness of the second flexible coupling member is set to $R=R_0/(1-R_a\theta/(2L))$ when a rotational angle of the rotary body is $\theta$, $R_0$ is a distance from the center of the rotary axis of the rotary body to the center of the thickness of the second flexible coupling member when the rotational angle $\theta=0$, $R_a$ is a radius of the rotary body, and L is a length of the inner space where the piston moves in the cylinder.

With such a configuration, it is possible to obtain a gas spring device which can apply a constant force to the displacement part regardless of a rotational angle of the rotary body by making use of a combined torque obtained by a torque applied to the rotary body by the gas spring and a torque applied to the rotary body by the torque compensating part.

9th aspect: The gas spring device according to any one of the 1st to 8th aspects, wherein the speed change part arranged between the gas spring and the rotary body, comprises:

a third flexible coupling member that is connected to the gas spring, to which a tension due to the force generated by the gas spring is applied;

a third non-true-circular disk that is rotatably arranged in the frame, around which the third flexible coupling member is wound; and a second transmitting part that transmits to the rotary body a torque applied to the third non-true-circular disk by tension of the third flexible coupling member.

With such a configuration, a characteristic required for the speed change part can be realized with a simple configuration. Hence, it is possible to obtain a gas spring device having stable performance.

10th aspect: The gas spring device according to any one of the 1st to 9th aspects, wherein a force or a torque taken out from the displacement part is constant regardless of a displacement or an angular displacement.

With such a configuration, a constant load characteristic can be realized regardless of the amount of gas in the inner space of the gas spring. Hence, it is possible to obtain a constant-load gas spring device in which a generating force thereof can be varied.

11th aspect: The gas spring device according to any one of the 1st to 9th aspects, wherein a force or a torque taken out from the displacement part changes linearly with respect to a displacement or an angular displacement.

With such a configuration, a linear spring characteristic can be realized regardless of the amount of gas in the inner space of the gas spring. Hence, it is possible to obtain a linear gas spring device in which a generating force and rigidity thereof can be varied.

12th aspect: A composite gas spring device comprising:
a plurality of the gas spring devices according to any one of the 1st to 11th aspects having different characteristics, wherein
the displacement part, and the speed change part arranged between the displacement part and the rotary body in the respective gas spring devices are shared by the plurality of gas spring devices.

With such a configuration, characteristics of the gas spring devices according to any one of the 1st to 11th aspects can be combined. Hence, it is possible to obtain a gas spring device having more complicated characteristics.

13th aspect: A balancer device comprising:
the gas spring device according to any one of the 1st to 11th aspects; and
a holding part that supports an own weight of an object connected to the displacement part of the gas spring device.

With such a configuration, a balancer device provided with the gas spring device according to anyone of the 1st to 11th aspects can be formed. Hence, it is possible to obtain the balancer device which achieves the operation and effects of the gas spring device.

14th aspect: A gas pressure actuator comprising:
the gas spring device according to any one of the 1st to 11th aspects; and
a control device that is connected to the suction/discharge part of the gas spring device, and changes a generating force of the gas spring device by controlling a pressure in an inner space of the gas spring.

With such a configuration, a gas pressure actuator provided with the gas spring device according to any one of the 1st to 11th aspects can be formed. Hence, it is possible to obtain the gas pressure actuator which achieves the operation and effects of the gas spring device.

15th aspect: A bias load compensating actuator comprising:
the gas spring device according to any one of the 1st to 11th aspects; and
an actuator that applies a force to the displacement part of the gas spring device in parallel.

With such a configuration, a bias load compensating actuator provided with the gas spring device according to any one of the 1st to 11th aspects can be formed. Hence, it is possible to obtain the bias load compensating actuator which achieves the operation and effects of the gas spring device.

Hereinafter, a gas spring device, and a balancer device and an actuator which use the gas spring device according to embodiments of the present invention will be described with reference to the drawings.

(First Embodiment)
<Configuration>

Figure 2:
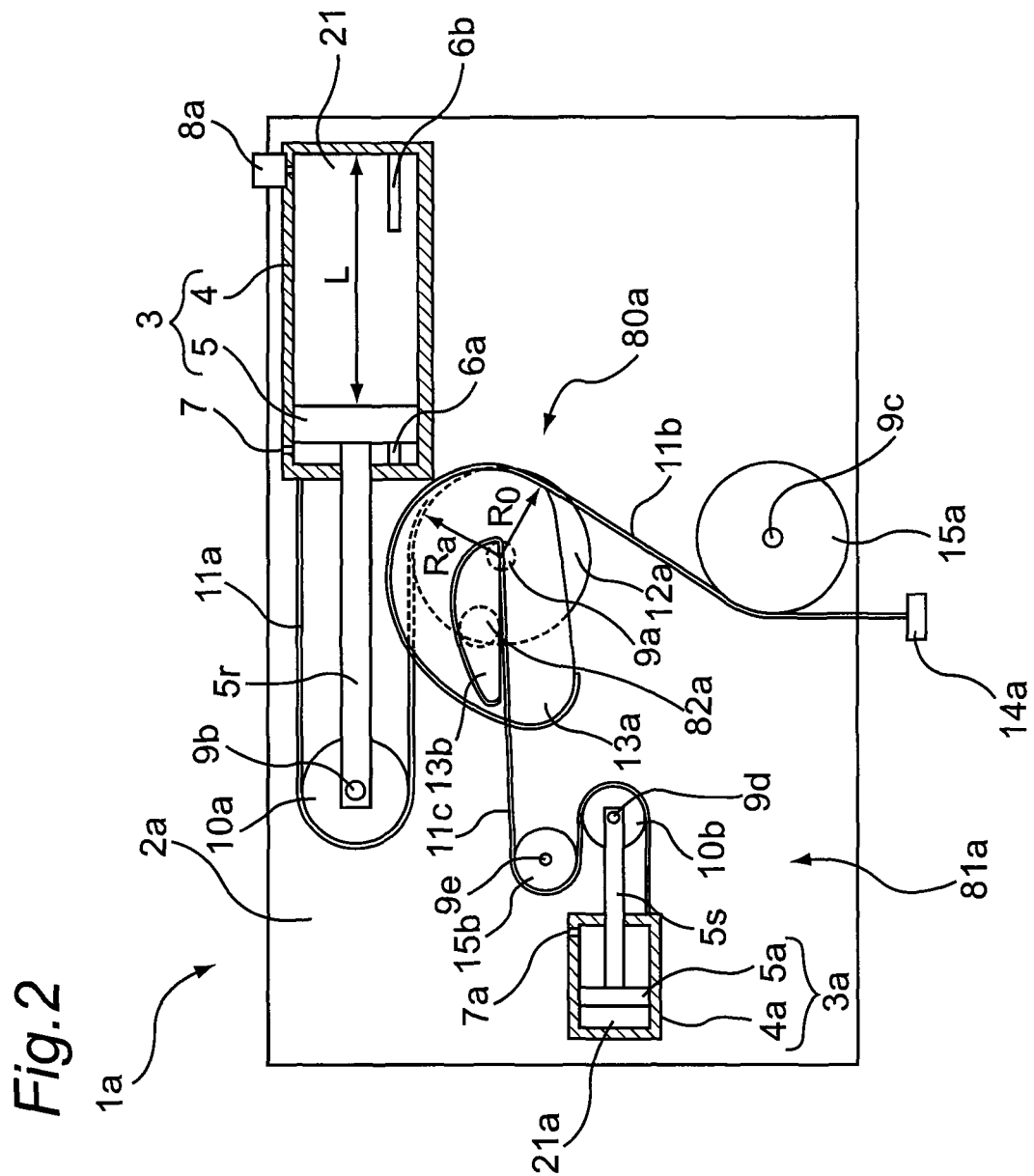
FIG. 2 is a schematic partial cross-sectional view of the air spring device according to the first embodiment of the present invention in an expanded state.

FIG. 1 schematically shows a first air spring device 1a according to a first embodiment of the present invention in a compressed state. FIG. 2 schematically shows the first air spring device 1a according to the first embodiment of the present invention in an expanded state.

The first air spring device 1a includes: a first air spring 3 as one example of a gas spring; a first circular disk member 12a as one example of a rotary body; a first speed change part 80a; a first torque compensating part 81a; and a first connector 14a as one example of a first displacement part.

The first air spring 3 is configured by a first cylinder 4, and a first piston 5 which moves inside the first cylinder 4. A first through hole 7 and a first suction/discharge valve 8a as one example of a suction/discharge part are provided on respective end portions of the first cylinder 4.

The first speed change part 80a is configured by a second non-circular disk member 13a as one example of a second non-true-circular disk, and a second steel belt 11b as one example of a second flexible coupling member. The first speed change part 80a converts a combined torque obtained by a torque due to a generating force of the first air spring 3 transmitted to the second non-circular disk member 13a and a torque due to a first torque compensating part described later at an arbitrary ratio, and transmits the combined torque to the second steel belt 11b.

The first torque compensating part 81a is configured by: a second air spring 3a as one example of an elastic body; a first non-circular disk member 13b as one example of a first non-true-circular disk; a first steel belt 11c as one example of a first flexible coupling member; and a first coupling plate 82a as one example of a first transmitting part. Although described in detail later, the first torque compensating part 81a sets a torque applied to the first circular disk member 12a to substantially 0 when an amount of gas in a first inner space 21 of the first air spring 3 is set to a predetermined value.

In the first air spring device 1a shown in FIG. 1, a first frame 2a is a plate-like member. The first air spring 3 as one example of the gas spring is fixed to the first frame 2a. The first air spring 3 is configured by the first cylinder 4 and the first piston 5. For example, the first piston 5 is arranged in a reciprocating manner in the lateral direction, and a stroke of the first piston 5 is restricted by stoppers 6a, 6b provided at both ends of the inside of the first cylinder 4. The first through hole 7 and the first suction/discharge valve 8a as one example of the suction/discharge part are respectively provided on both ends of the first cylinder 4. The first suction/discharge valve 8a serves as a connecting port which is connected with a pressure source (see, e.g., reference numeral 43 in FIG. 11) through the first suction/discharge valve 8a when an amount of air in the first inner space 21 of the first cylinder 4 is to be increased, and serves as a discharge port for discharging air to the surrounding atmosphere through the first suction/discharge valve 8a when the amount of air in the first inner space 21 is to be decreased. However, in other cases, the first suction/discharge valve 8a is closed, thus continuously maintaining the amount of air in the first inner space 21. A force which is proportional to a differential pressure between an air pressure in the first inner space 21 and an atmospheric pressure maintained by the first through hole 7 is applied to the first piston 5, and the differential pressure pushes a second shaft 9b provided on a distal end of a first piston rod 5r of the first piston 5. A first movable pulley 10a is rotatably coupled to the second shaft 9b. A fourth steel belt 11a which has one end thereof fixed to the first cylinder 4 is wound around the first movable pulley 10a. The other end of the fourth steel belt 11a is fixed to the first circular disk member 12a as one example of the rotary body, and the fourth steel belt 11a is wound around an outer periphery of the first circular disk member 12a. In FIG. 1, the first circular disk member 12a is rotatably coupled to a first shaft (rotary shaft) 9a fixed to the first frame 2a below the first movable pulley 10a. With such a configuration, a torque around the first shaft 9a is applied to the first circular disk member 12a due to a generating force of the first air spring 3.

The second non-circular disk member 13a and the second steel belt 11b which serve as one example of the first speed change part 80a are coupled to the first circular disk member 12a. The second non-circular disk member 13a as one example of the second non-true-circular disk is fixed to the first circular disk member 12a, and is rotated about the first shaft 9a integrally with the first circular disk member 12a. The second steel belt 11b as one example of the second flexible coupling member has one end thereof fixed to a portion (narrow width portion) of the second non-circular disk member 13a on a distal end side, and a portion close to the one end of the second steel belt 11b is wound around the second non-circular disk member 13a. A first connector 14a as one example of a first displacement part is provided to the other end of the second steel belt 11b, and the second steel belt 11b is can be coupled to an external load by the first connector 14a. To set a lateral position of the first connector 14a in the first frame 2a at a fixed position regardless of a rotational angle of the second non-circular disk member 13a, the second steel belt 11b has a middle portion thereof engaged with a first pulley 15a. In FIG. 1, the first pulley 15a is rotatably coupled to a third shaft 9c fixed to the first frame 2a below the first circular disk member 12a so that the displacement of the second steel belt 11b is not obstructed. With such a configuration, the first connector 14a is displaced in conjunction with a rotary movement of the first circular disk member 12a. In FIG. 1, the second steel belt 11b makes contact with the first pulley 15a and, thereafter, the first connector 14a provided to the lower end of the second steel belt 11b is suspended downward from the first pulley 15a.

The first non-circular disk member 13b, the first steel belt 11c, the second air spring 3a, and the first coupling plate 82a which serve as one example of the first torque compensating part 81a are coupled to the second non-circular disk member 13a. The first non-circular disk member 13b as one example of the first non-true-circular disk is fixed to the second non-circular disk member 13a by way of a circular-disk-shaped first coupling plate 82a as one example of a first transmitting part which is arranged between the first non-circular disk member 13b and the second non-circular disk member 13a. The shape of the first coupling plate 82a is not limited to a circular disk shape, and the first coupling plate 82a can be formed into any shape. The first coupling plate 82a transmits, to the first circular disk member 12a, a torque applied to the first non-circular disk member 13b due to a tension of the first steel belt 11c. The first non-circular disk member 13b, the first coupling plate 82a, the second non-circular disk member 13a, and the first circular disk member 12a integrally rotates about the first shaft 9a.

The first steel belt 11c as one example of the first flexible coupling member has one end thereof fixed to a portion (narrow width portion) of the first non-circular disk member 13b on a distal end side, and a portion close to the one end of the first steel belt 11c is wound around the first non-circular disk member 13b. The other end of the first steel belt 11c is coupled to a second cylinder 4a that constitutes a second air spring 3a as one example of an elastic body.

In FIG. 1, the second air spring 3a is arranged at a position below the first circular disk member 12a and displaced in the lateral direction (in the left direction in FIG. 1), and is configured by the second cylinder 4a and a second piston 5a which moves inside the second cylinder 4a. For example, the second piston 5a is also arranged in a reciprocating manner in the lateral direction. To the second piston 5a, a force is applied which is proportional to a differential pressure between an air pressure in a second inner space 21a closed by the second cylinder 4a and an atmospheric pressure which is maintained through a first through hole 7a formed in the second cylinder 4a on a second piston rod 5s side, and pushes a fourth shaft 9d provided on a distal end of the second piston rod 5s of the second piston 5a. A second movable pulley 10b is rotatably coupled to the fourth shaft 9d. The first steel belt 11c is coupled between the second cylinder 4a and the first non-circular disk member 13b in a state of being wound around the second movable pulley 10b and a second pulley 15b. The second pulley 15b is rotatably coupled to a fifth shaft 9e fixed to the first frame 2a so that the displacement of the first steel belt 11c is not obstructed. In FIG. 1, with respect to the arrangement relationship from the first shaft 9a to the fourth shaft 9d, as one example, the second shaft 9b, the first shaft 9a, the fifth shaft 9e, the fourth shaft 9d, and the third shaft 9c are arranged to be positioned in this order downwardly from above.

Next, the operation of the first air spring device 1a will be described.

In the state shown in FIG. 1, due to a generating force of the first air spring 3, the first piston 5 moves in the left direction in FIG. 1 and then, the first movable pulley 10a rotates in the clockwise direction, so that a tension is generated in the fourth steel belt 11a. Thus, a torque in the counterclockwise direction is applied to the first circular disk member 12a. In addition, due to a generating force of the second air spring 3a, the second piston 5a moves in the right direction in FIG. 1 and the second movable pulley 10b rotates in the clockwise direction, so that a tension is generated in the first steel belt 11c. Thus, a torque in the clockwise direction is generated in the first non-circular disk member 13b. The first circular disk member 12a, the second non-circular disk member 13a, and the first non-circular disk member 13b rotate integrally about the first shaft 9a. Hence, a combined torque obtained by a torque in the counterclockwise direction generated by the first air spring 3 and a torque in the clockwise direction generated by the second air spring 3a is transmitted to the second non-circular disk member 13a. To the second steel belt 11b wound around the second non-circular disk member 13a, a tension is applied which is obtained by dividing the combined torque by a distance (radius) R from the center of the first shaft 9a to a contact point where the second steel belt 11b makes contact with a curved side surface of the second non-circular disk member 13a as a tangent, and a force in the upward direction in FIG. 1 is applied to the first connector 14a.

Before the state shown in FIG. 1 is changed to the state shown in FIG. 2 due to the expansion of air in the first inner space 21 of the first air spring 3, the respective constituent elements move or rotate in the directions indicated by arrows shown in FIG. 1. Energy which is lost due to the expansion of air in the first inner space 21 of the first air spring 3 is used for moving a load by way of the first connector 14a and for compressing the second air spring 3a.

Hereinafter, forces and torques generated when the first air spring device 1a is operated will be described.

Figure 3:
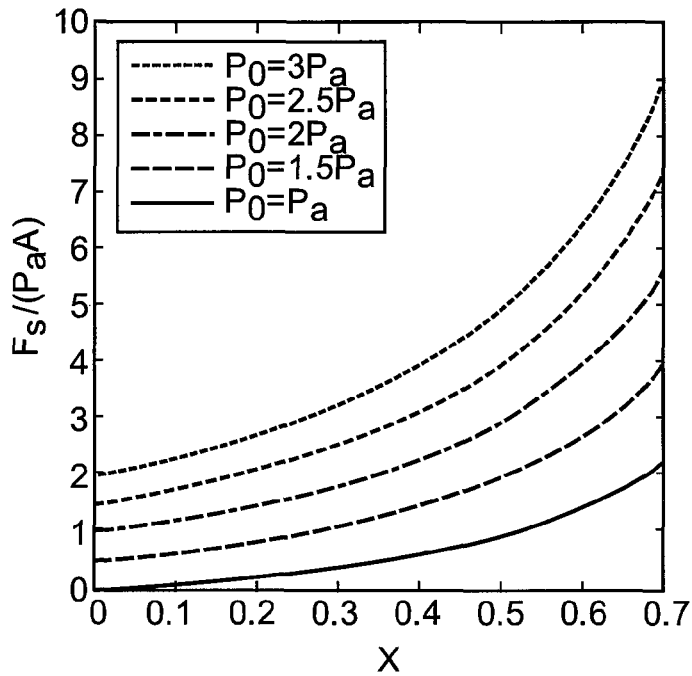
FIG. 3 is a graph showing the relationship between a displacement and a generating force of a first air spring in the first embodiment and a second embodiment of the present invention.

FIG. 3 shows the relationship between a displacement and a generating force of the first air spring 3 in the first embodiment of the present invention. In FIG. 3, X indicates a position of the first piston 5. When X=0, the first piston 5 is at the position making contact with the stopper 6a, and when X=0.7, the first piston 5 is at the position making contact with the stopper 6b. Assuming that a volume of the first inner space 21 shown in FIG. 2 is expressed using a product AL of a cross-sectional area A and a length L, the volume of the first inner space 21 is expressed as AL (1−X). That is, the first air spring 3 is configured such that the volume of the first inner space 21 becomes 0.3AL in the state shown in FIG. 1. The first embodiment describes the case where the position X of the first piston 5 in FIG. 1 is at a maximum value, that is, $X=X_{max}=0.7$. However, the present invention is not limited thereto. As one example, $X_{max}$ can practically take a value which falls within a range of 0.3 to 0.9. As a value of the position (displacement) X is larger, the volume of the first inner space 21 becomes smaller so that a pressure in the first inner space 21 is increased. Further, $F_s$ indicates a generating force of the first air spring 3, and is a value obtained by multiplying a differential pressure between a pressure $P_0/(1-X)$ in the first inner space 21 and an atmospheric pressure $P_a$ by the cross-sectional area A. Assuming that the pressure in the first inner space 21 when the volume of the first inner space 21 is AL is an absolute pressure $P_0$, provided that the first air spring 3 is in an isothermal process, the generating force $F_s$ of the first air spring 3 is expressed by $F_s=(P_0/(1-X)-P_a)A$. In FIG. 3, the generating force $F_s$ of the first air spring 3 is indicated by normalizing the generating force $F_s$ by $P_aA$. It is understood from FIG. 3 that the generating force of the first air spring 3 greatly changes corresponding to the position of the first piston 5. As one example, when the pressure $P_0$ is set to approximately $P_a$ to $7P_a$, the pressure is low, and there is an advantage that the handling of the first air spring 3 as a pneumatic device is facilitated. Moreover, as one example, when the pressure $P_0$ is set to approximately $30P_a$ to $80P_a$, there is an advantage that the first air spring 3 can be miniaturized.

Figure 4:
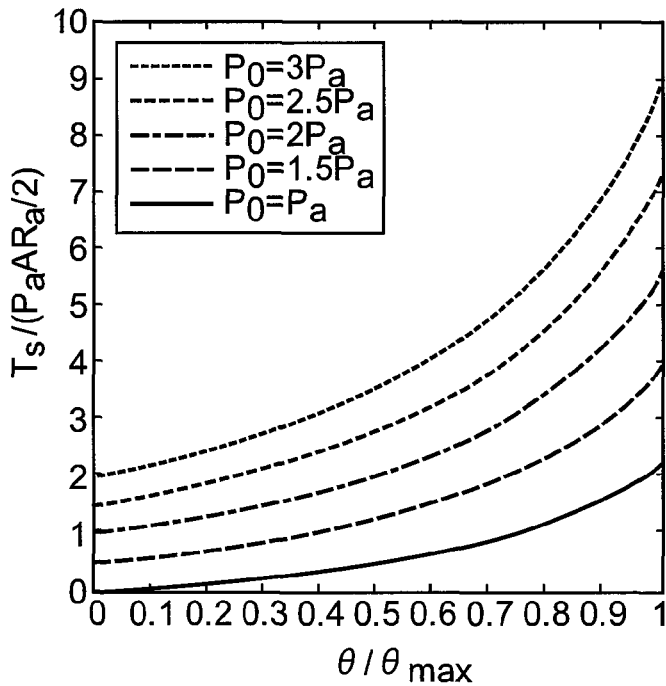
FIG. 4 is a graph showing the relationship between a rotational angle of a circular disk member and a torque due to a generating force of the first air spring which is applied to the circular disk member in the first embodiment of the present invention.

FIG. 4 shows the relationship between a rotational angle of the first circular disk member 12a and a torque $T_s$ due to a generating force $F_s$ of the first air spring 3 applied to the first circular disk member 12a in the first embodiment of the present invention. In FIG. 4, θ indicates a rotational angle of the first circular disk member 12a. The rotational angle θ of the first circular disk member 12a in FIG. 2 is set to θ=0, and the rotational angle θ is increased along with the increase of an amount of rotation in the clockwise direction from the rotational angle θ shown in FIG. 2.

The rotational angle θ of the first circular disk member 12a in FIG. 1 is set to $θ=θ_{max}$. That is, the rotational angle θ becomes θ=0 when X=0, and the rotational angle θ becomes $θ=θ_{max}$ when $X=X_{max}$. $R_a$ indicates a radius of the first circular disk member 12a. In the first embodiment, a stroke of the first air spring 3 is increased twice by using the first movable pulley 10a and hence, the rotational angle θ becomes $θ=2LX/R_a$. A torque $T_s$ due to a generating force $F_s$ of the first air spring 3 applied to the first circular disk member 12a becomes $T_s=F_sR_a/2$. In FIG. 4, the torque $T_s$ is normalized by $P_aAR_a/2$, and the rotational angle θ is normalized by $θ_{max}$. As can be understood from FIG. 4, the torque due to the generating force $F_s$ of the first air spring 3 applied to the first circular disk member 12a greatly changes corresponding to a rotational angle of the first circular disk member 12a.

Figure 5:
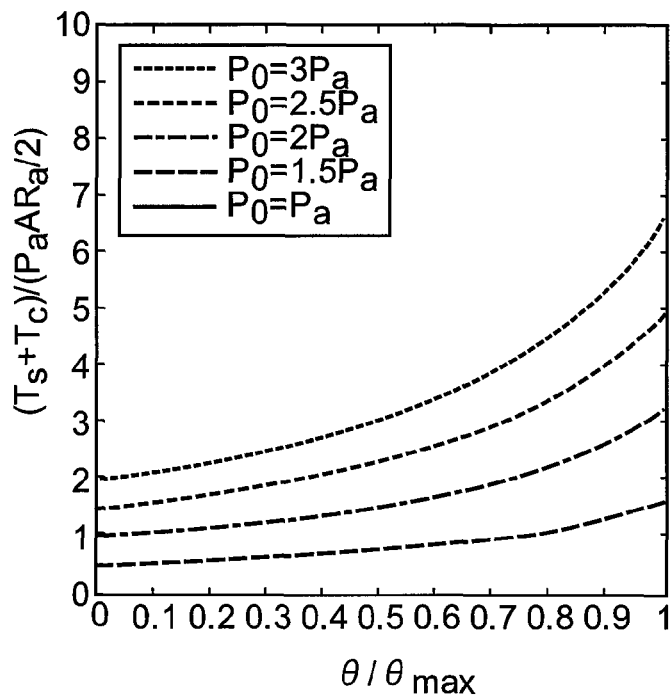
FIG. 5 is a graph showing the relationship between a rotational angle of the circular disk member and a torque due to generating forces of the first air spring and a second air spring which is applied to the circular disk member in the first embodiment of the present invention.

FIG. 5 shows the relationship between a rotational angle θ of the first circular disk member 12a and a torque $T_s T_c$ due to generating forces of the first air spring 3 and the second air spring 3a applied to the first circular disk member 12a in the first embodiment of the present invention. In the first embodiment, a torque which balances with a torque $T_s$ due to the generating force $F_s$ of the first air spring 3 with an amount of air in the first inner space 21 where the pressure $P_0$ is $P_0=P_a$ is applied to the first circular disk member 12a due to the generating force of the second air spring 3a. That is, assuming that a torque applied to the first circular disk member 12a due to the generating force of the second air spring 3a is set to be as $T_c$, the torque $T_c$ is expressed by $T_c=-(X/(1-X))P_aAR_a/2$. Accordingly, the torque $T_s+T_c$ is expressed by $T_s+T_c=(1/(1-X))(P_0-P_a)AR_a/2$. In FIG. 5, the torque $T_s+T_c$ is normalized by $P_aAR_a/2$, and the rotational angle θ is normalized by $θ_{max}$. It is confirmed from FIG. 5 that the torque $T_s+T_c$ at $P_0=P_a$ becomes 0 by the first torque compensating part 81a. That is, at $P_0=P_a$, the torque $T_s+T_c$ due to the generating forces of the first air spring 3 and the second air spring 3a applied to the first circular disk member 12a becomes 0. Although an ideal state is described herein with respect to the torque $T_c$, actually, the deviation of approximately 2% may take place with respect to the torque $T_c$ due to an error in the manufacture of the air spring device. However, such deviation causes no problem in practical use. Accordingly, in this specification, such a state is referred to as a state where the torque becomes 0. Actually, however, it can be said that such a state refers to substantially 0 including an error in manufacture of the air spring device. With respect to the torques compared with the rotational angle herein, described is the relationship between the rotational angle θ and center values of the torque $T_s$ and the torque $T_c$ from which hysteresis components such as frictional resistances are removed from the torques $T_s$, $T_c$.

The torque $T_c$ is a torque which does not depend on the pressure $P_0$ and hence, a shape of the first non-circular disk member 13b is formed such that a torque $F_cR_c/2$ which is obtained by multiplying a value obtained by dividing the generating force $F_c$ of the second air spring 3a by 2 at each rotational angle θ by a distance $R_c$ from the center of the first shaft 9a to the center of the thickness of the first steel belt 11c becomes equal to the torque $T_c$. That is, the first non-circular disk member 13b is configured by a rotatable plate-like member having a curved side surface formed of a group of a plurality of arcs each having a different radius of curvature, and the first steel belt 11c can be brought into contact with and wound around the curved side surface due to the rotation of the plate-like member. With such a configuration, it is possible to realize the first torque compensating part 81a which generates the torque $T_c$. The generating force $F_c$ is divided by 2 because, in the first embodiment, a stroke of the second air spring 3a is increased twice with the use of the second movable pulley 10b. Assuming that a cross-sectional area of the second inner space 21a is expressed as A', a length of the second inner space 21a is expressed as L', the position of the second piston 5a is expressed as X' and a pressure at a volume A'L' of the second inner space 21a is expressed as an absolute pressure $P'_0$, the volume of the second inner space 21a of the second air spring 3a is expressed as A'L'(1−X') and the generating force is expressed as $F_c=(P'_0/(1-X')-P_a)A'$. Assume that the position X' becomes $X'=X'_{max}$ when θ=0, and the position X' becomes X'=0 when $θ=θ_{max}$. The second air spring 3a generates a torque which balances with the torque $T_s$ due to the generating force $F_s$ of the second air spring 3a with an amount of air in the first inner space 21 which brings about $P_0=P_a$. Accordingly, based on a change in exergy of air within a range of θ=0 to $θ_{max}$, that is, within a range of X=0 to $X_{max}$, $P_aAL(X_{max}+\ln(1-X_{max}))=A'L'(P_aX'_{max}+P'_0\ln(1-X'_{max}))$ is established. From this equation, when three values are given out of A', L', $X'_{max}$ and $P'_0$, a remaining value can be obtained and hence, various factors or elements on the second air spring 3a which corresponds to the first air spring 3 can be determined. To make a change in exergy from X=0 and a change in exergy from $X'=X'_{max}$ balance with each other, it is necessary that $P_aAL(X+\ln(1-X))=A'L'(P_a(X'_{max}-X')+P'_0\ln((1-X'_{max})/(1-X')))$ is established. From this equation, the relationship between X' and X is obtained or the relationship between X' and the rotational angle θ is obtained from $θ=2LX/R_a$. Accordingly, $T_c$ and $F_c$ at each rotational angle θ can be obtained and hence, a distance $R_c$ from the center of the first shaft 9a to the center of the thickness of the first steel belt 11c can be obtained from $R_c=2T_c/F_c$. As one example, practically, $X'_{max}$ is also set to a value which falls within a range of 0.3 to 0.9.

Figure 6:
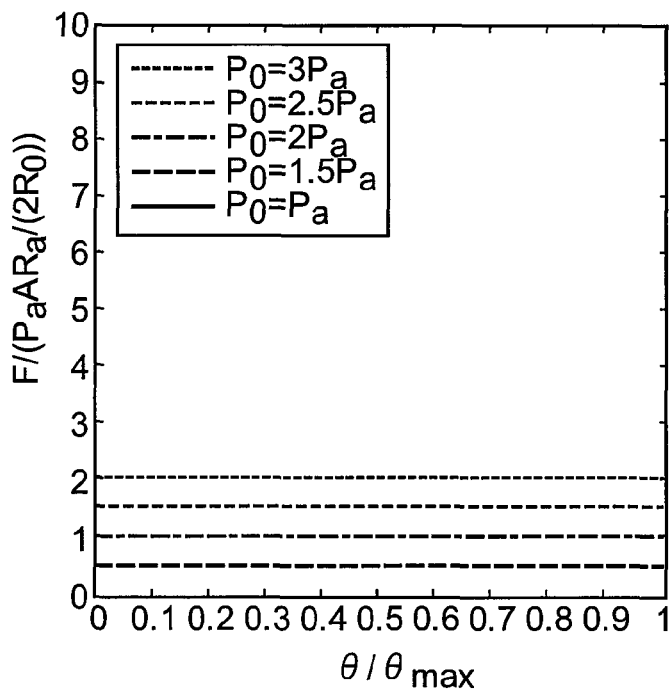
FIG. 6 is a graph showing the relationship between a rotational angle of the circular disk member and a tension applied to a steel belt in the first embodiment of the present invention.

FIG. 6 shows the relationship between a rotational angle θ of the first circular disk member 12a and a tension $F_1$ applied to the second steel belt 11b in the first embodiment of the present invention. In the first embodiment, the second non-circular disk member 13a around which the second steel belt 11b is wound is configured by a rotatable plate-like member having a curved side surface formed of a group of a plurality of arcs each having a different radius of curvature. The second steel belt 11b makes contact with and is wound around the curved side surface due to the rotation of the plate-like member. More specifically, a shape of the second non-circular disk member 13a is formed such that a distance R from the center of the first shaft 9a to the center of the thickness of the second steel belt 11b when a rotational angle of the first circular disk member 12a becomes the rotational angle θ satisfies $R=R_0/(1-X)=R_0/(1-R_a\theta/(2L))$. Here, $R_0$ is a distance R at θ=0. Accordingly, a tension $F_1$ applied to the second steel belt 11b becomes $F_1=(T_s+T_c)/R=(P_0-P_a)AR_a/(2R_0)$, and takes a constant value regardless of the rotational angle θ. In FIG. 6, a tension $F_1$ applied to the second steel belt 11b is normalized by $P_aAR_a/(2R_0)$, and the rotational angle θ is normalized by $\theta_{max}$. From FIG. 6, it is understood that the force F applied to the first connector 14a can be adjusted in a wide range by changing the pressure $P_0$ in the first embodiment. It is also understood that, even when the value of the pressure $P_0$ changes, a characteristic of a constant load spring where the force $F_1$ becomes constant can be maintained regardless of the position of the first connector 14a. As one example, by setting a moving speed of the first connector 14a at the time of using the first air spring device 1a to a low speed (e.g., approximately 3 cm/s) such that a change of the first air spring 3 is considered as an isothermal change, the performance of the first air spring device 1a becomes stable.

Figure 7A:
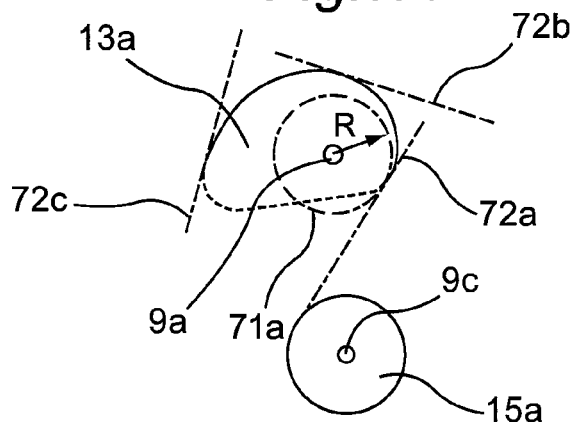
FIG. 7A is a view showing the relationship between a shape of a non-circular disk member and a common tangent when $\theta=0$ in the first embodiment of the present invention.
Figure 7B:
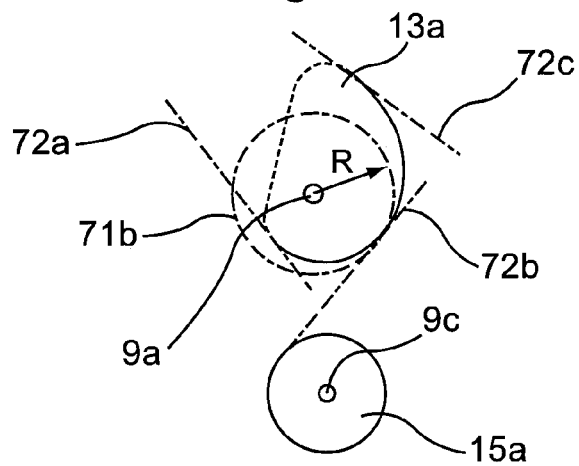
FIG. 7B is a view showing the relationship between the shape of the non-circular disk member and a common tangent when $\theta=\theta_{max}/2$ in the first embodiment of the present invention.
Figure 7C:
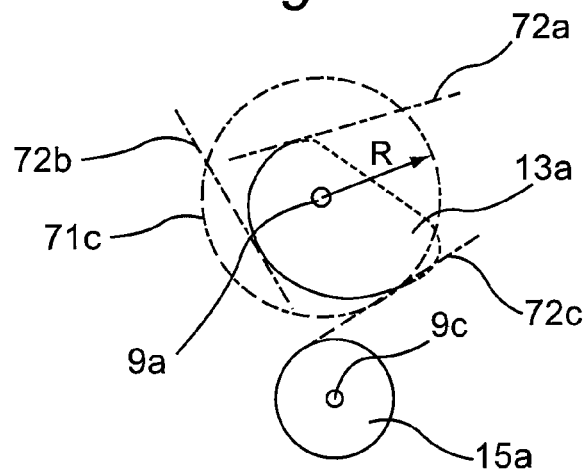
FIG. 7C is a view showing the relationship between the shape of the non-circular disk member and a common tangent when $\theta=\theta_{max}$ in the first embodiment of the present invention.

The shape of the second non-circular disk member 13a and the shape of the first non-circular disk member 13b will be further described. As described above, the shape of the second non-circular disk member 13a is a shape in which a distance from the center of the first shaft 9a to the center of the thickness of the second steel belt 11b when a rotational angle of the first circular disk member 12a is θ becomes the distance R which is a function of the rotational angle θ. The shape of the first non-circular disk member 13b is a shape in which a distance from the center of the first shaft 9a to the center of the thickness of the first steel belt 11c when a rotational angle of the first circular disk member 12a is θ becomes the distance $R_c$ which is a function of the rotational angle θ. That is, the shape of the second non-circular disk member 13a becomes a curve which makes contact with all common tangents when a common tangent is drawn between a circle having the radius R which is coaxial with the first shaft 9a and a pitch circle of the first pulley 15a at the respective rotational angles θ. This state is shown in FIG. 7A, FIG. 7B, and FIG. 7C. FIG. 7A shows a state where θ=0, wherein a common tangent 72a is drawn as a common tangent between a reference circle 71a having a radius $R=R_0$ and a pitch circle of the first pulley 15a. FIG. 7B shows a state where $\theta=\theta_{max}/2$, wherein a common tangent 72b is drawn as a common tangent between a reference circle 71b having a radius $R=R_0/(1-R_a\theta_{max}/(4L))$ and a pitch circle of the first pulley 15a. FIG. 7C shows a state where $\theta=\theta_{max}$, wherein a common tangent 72c is drawn as a common tangent between a reference circle 71c having a radius $R=R_0/(1-R_a\theta_{max}/(2L))$ and the pitch circle of the first pulley 15a. A portion of a profile of the second non-circular disk member 13a indicated by a solid line forms a curve which makes contact with all of the common tangent 72a, the common tangent 72b, and the common tangent 72c. This portion becomes an important portion of the shape of the second non-circular disk member 13a. A portion of the profile of the second non-circular disk member 13a indicated by a broken line may be freely selected provided that the portion is shaped so as to be in contact with none of common tangents for preventing the contact of the portion with the second steel belt 11b during the rotation of the second non-circular disk member 13a. In the same manner, the shape of the first non-circular disk member 13b becomes a curved line which makes contact with all common tangents when a common tangent is drawn between a circle having the radius $R_c$ which is coaxial with the first shaft 9a and a pitch circle of the second pulley 15b at the respective rotational angles θ.

Figure 8:
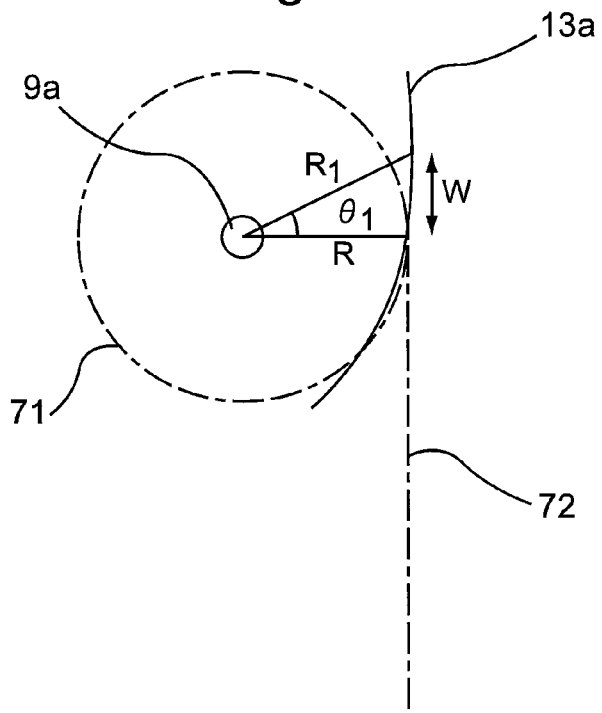
FIG. 8 is a view showing the relationship among a reference circle, a common tangent, and a shape of the circular disk member in the first embodiment of the present invention.

This shape will be described in further detail with reference to FIG. 8. FIG. 8 shows the relationship among a reference circle 71, a common tangent 72, and the profile of the second non-circular disk member 13a at a certain rotational angle θ. W indicates an interval between a contact point between the reference circle 71 and the common tangent 72 and a contact point between the profile of the second non-circular disk member 13a and the common tangent 72. $\theta_1$ indicates an angle formed by lines which connect the center of the first shaft 9a and the respective contact points respectively. $R_1$ indicates a distance from the center of the first shaft 9a to the contact point between the profile of the second non-circular disk member 13a and the common tangent 72.

Firstly, the case where the interval between the first shaft 9a and the third shaft 9c is infinite will be described. In this case, the direction of the common tangent 72 always becomes the direction formed by connecting the center of the first shaft 9a and the center of the third shaft 9c even when the rotational angle θ changes. In this case, the profile of the second non-circular disk member 13a becomes a shape formed by plotting with a radius $R_1$ and an angle $\theta+\theta_1$ using the distance $R_1$ and the angle $\theta_1$ which are functions of the rotational angle θ. The distance $R_1$ is sqrt $(R^2+W^2)$ and the angle $\theta_1$ is expressed as $\tan^{-1}(W/R)$. When the interval between the first shaft 9a and the third shaft 9c is infinite, by setting dR/dθ which is obtained by differentiating the distance R with respect to the rotational angle θ as the interval W, it is possible to obtain the profile of the second non-circular disk member 13a which makes contact with all common tangents at the respective rotational angles θ.

Next, the case where the interval between the first shaft 9a and the third shaft 9c is a finite value Y will be described. In this case, the direction of the common tangent 72 changes corresponding to the rotational angle θ and hence, the profile of the second non-circular disk member 13a becomes a shape formed by plotting with the radius $R_1$ and the rotational angle $\theta+\theta_1-\sin^{-1}((R+R_p)/Y)$. Here, the direction of the common tangent 72 is inclined from the direction formed by connecting the center of the first shaft 9a and the center of the third shaft 9c by $\sin^{-1}((R+R_p)/Y)$, wherein $R_p$ is a radius of a pitch circle of the first pulley 15a. By setting the distance W by the following equation, it is possible to obtain the profile of the second non-circular disk member 13a which makes contact with all common tangents at the respective rotational angles θ.

$$W = \frac{\sqrt{Y^2 - (R+R_p)^2}}{\sqrt{Y^2 - (R+R_p)^2 - \frac{dR}{d\theta}}} \frac{dR}{d\theta}$$

When the bending direction of the second steel belt 11b is the same between the second non-circular disk member 13a and the first pulley 15a unlike the first embodiment where the bending direction is different, it is possible to obtain the profile of the second non-circular disk member 13a by replacing the whole $R+R_p$ with $R-R_p$. However, the shape obtained in the above-mentioned manner is a shape corresponding to the pitch circle of the first pulley 15a and hence, a shape to be actually formed is a shape which is offset by a half of thickness of the second steel belt 11b in the normal direction on the center-of-rotation side.

Figure 9A:
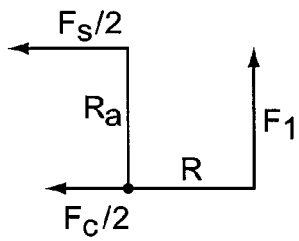
FIG. 9A is a view showing a state of a torque applied to the circular disk member when $\theta=0$ in the first embodiment of the present invention.
Figure 9B:
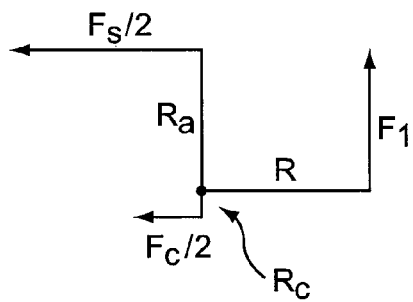
FIG. 9B is a view showing a state of a torque applied to the circular disk member when $\theta=\theta_{max}/2$ in the first embodiment of the present invention.
Figure 9C:
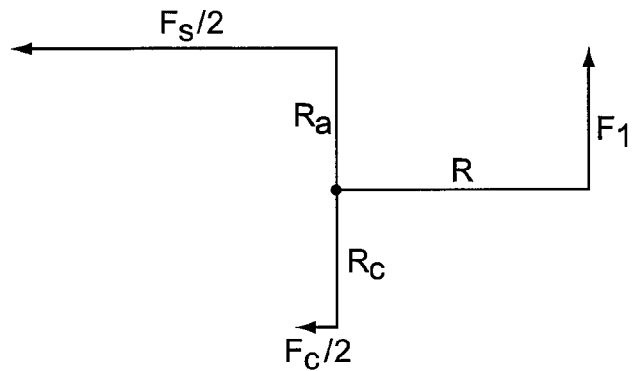
FIG. 9C is a view showing a state of a torque applied to the circular disk member when $\theta=\theta_{max}$ in the first embodiment of the present invention.

States of a torque applied to the first circular disk member 12a are shown in FIG. 9A, FIG. 9B, and FIG. 9C. FIG. 9A, FIG. 9B, and FIG. 9C show states where $\theta=0$, $\theta_{max}/2$, $\theta_{max}$, respectively. To facilitate understanding, the direction in which a force is applied is expressed as the horizontal direction or the vertical direction. Here, the radius $R_a$ and the tension $F_1$ are set as constant values which do not depend on the rotational angle $\theta$. As can be understood from FIG. 9A, FIG. 9B, and FIG. 9C, as the rotational angle $\theta$ is larger, the first air spring 3 is further compressed so that a tension $F_s/2$ applied to the fourth steel belt 11a is increased, and a torque in the counterclockwise direction due to a generating force of the first air spring 3 is increased. On the other hand, as the rotational angle $\theta$ is larger, the air in the second inner space 21a of the second air spring 3a is further expanded and hence, a tension $F_c/2$ applied to the first steel belt 11c is decreased. However, it is also understood that, due to the shape of the first non-circular disk member 13b, the distance $R_c$ is increased such that a torque $T_c$ is generated in the clockwise direction which balances with a torque $T_s$ due to a generating force $F_s$ of the first air spring 3 with the amount of air in the first inner space 21 where the pressure $P_0$ is $P_0=P_a$. In this manner, although the tension $F_c/2$ becomes smaller as the rotational angle $\theta$ becomes larger, the torque $T_c$ in the clockwise direction is increased. Then, finally, due to the shape of the second non-circular disk member 13a, the distance R is increased as the rotational angle $\theta$ becomes larger, such that the constant tension $F_1$ is applied to the second steel belt 11b due to a combined torque $T_s+T_c$ in the counterclockwise direction.

<Effects>

According to the configuration of the first embodiment, by applying a torque due to a generating force of the first air spring 3 and a torque due to the second air spring 3a to the first circular disk member 12a, it is possible to apply a force which changes in accordance with an amount of air in the first inner space 21 of the first air spring 3 to the first connector 14a while maintaining a constant load spring characteristic defined by the second non-circular disk member 13a. That is, according to the first embodiment, a generating force can be easily changed by adjusting an amount of air in the first inner space 21 of the first air spring 3, and a constant force can be generated regardless of a position of the first connector 14a while maintaining an amount of air in the first inner space 21 of the first air spring 3 constant. Accordingly, it is possible to obtain the first air spring device 1a which can easily cope with a change in load weight in a wide range, and in which suction/discharge of a gas associated with a change in position is unnecessary.

In the first embodiment, air is used as a working gas for the first air spring 3 and the second air spring 3a. However, the present invention is not limited thereto, and various gases which are considered as ideal gases can be used. As one example, air has an advantage that the air can be obtained easily. As another example, an inert gas such as nitrogen has an advantage that properties of the inert gas are stable.

In the first embodiment, the displacement of the first air spring 3 and the displacement of the second air spring 3a are increased twice using the movable pulley. However, the present invention is not limited thereto, and the steel belt 11a, 11c may be directly fixed to a distal end of the first or second piston rod 5r, 5s. Further, as one example of the first speed change part 80a, even when the displacement of the first air spring 3 or the second air spring 3a is converted with arbitrary magnification using arbitrary known stroke conversion mechanism, such displacement can be obtained in the same manner. Although the first air spring 3 and the second air spring 3a are configured to generate a force in the direction in which they extend, the present invention is not limited thereto. The first air spring 3 and the second air spring 3a may be configured to generate a force in the direction in which they retract.

In the first embodiment, the second air spring 3a is used as an elastic body. However, the present invention is not limited thereto, and the first embodiment can be carried out using any of various metal springs, magnetic springs, or arbitrary known elastic bodies. The shape of the first non-circular disk member 13b at this time can be obtained in the same manner by replacing a change in exergy of the second air spring 3a with a change in elastic energy of each elastic body.

In the first embodiment, the first air spring 3 is displaced in conjunction with the rotation of the first circular disk member 12a by interposing the steel belt 11a therebetween. However, the present invention is not limited thereto, and it can be performed using any one of known linear movement-rotation conversion such as a rack and pinion mechanism.

In the first embodiment, the first air spring 3 is configured by the piston and the cylinder mechanism. However, the present invention is not limited thereto, and the first embodiment can be carried out in the same manner also in the case where a rotational torque is applied to the first circular disk member 12a using a rotation-output type air spring such as a vane motor.

In the first embodiment, a stroke of the first piston 5 is limited by the stoppers provided on the inner portion of the cylinder. However, the present invention is not limited thereto, and the stroke of the first piston 5 can be limited in the same manner also by stoppers which are provided on an outer portion of the cylinder, a stopper which limits a rotational angle of the first circular disk member 12a, or a stopper which limits the displacement of the first connector 14a.

In the first embodiment, the steel belt is used as an example of the flexible coupling member. However, the present invention is not limited thereto, and the flexible coupling member may be formed in the same manner using a belt made of a material other than metal or a strip-like member such as a wire rope. When the strip-like member is used, as one example, a groove for preventing falling of the strip-like member is formed on outer peripheries of the first circular disk member 12a, the second and first non-circular disk members 13a, 13b, the first and second movable pulleys 10a, 10b, and the first and second pulleys 15a, 15b which correspond to the strip-like member respectively. Further, when the strip-like member is used, a rotational angle of the first circular disk member 12a is not limited to less than one rotation. That is, by forming the first circular disk member 12a into a drum-like rotary body and by forming the second non-circular disk members 13a, 13b into a rotary body provided with a conically spiral groove, the first circular disk member 12a may be rotated a plurality of times.

In the first embodiment, the first circular disk member 12a, and the second and first non-circular disk members 13a, 13b are integrally and coaxially rotated with each other. However, the present invention is not limited thereto, and the integral rotation of these members can be carried out in the same manner provided that these members are rotated in conjunction with each other. Hence, the members may be rotated about different axes by coupling these members to each other by gears, belts, or the like.

In the first embodiment, final output is the linear movement of the first connector 14a. However, the present invention is not limited thereto, and the final output may be the rotary movement of the first pulley 15a by winding the second steel belt 11b around the first pulley 15a, for example. In this case, the displacement part performs the rotary movement and hence, a constant torque can be taken out from the first pulley 15a regardless of the angular displacement of the first pulley 15a.

In the first embodiment, the lateral position of the first connector 14a is fixed by using the first pulley 15a. However, the present invention is not limited thereto, and the lateral position of the first connector 14a can be fixed in the same manner without using the first pulley 15a when a load can be coupled to the first connector 14a such that the pullout direction of the second steel belt 11b is not changed such as in a case where an object is coupled to the first connector 14a in a suspended manner.

In the first embodiment, the torque $T_s$ with an amount of air in the first inner space 21 where the pressure $P_0$ is $P_0=P_s$ is compensated by the first torque compensating part 81a. However, the present invention is not limited thereto. For example, the torque compensation can be performed in the same manner also by compensating a torque with an amount of air which brings the pressure $P_0$ to $P_0=\alpha P_a$ ($\alpha$: any value of 1 or more) by the first torque compensating part 81a. In this case, the torque $T_s+T_c$ is expressed by $T_s+T_c=(1/(1-X))(P_0-\alpha P_a)AR_d/2$ and hence, the first torque compensating part 81a can be used as a constant load spring when $P_0 \geq \alpha P_a$.

In the first embodiment, a characteristic of a constant load spring is realized by the second non-circular disk member 13a and the second steel belt 11b. However, the present invention is not limited thereto, and a spring characteristic which differs from a constant load may be used by changing a shape of the second non-circular disk member 13a.

Figure 10:
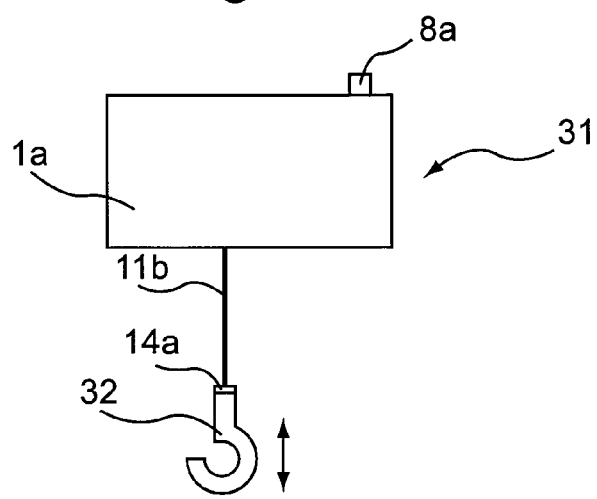
FIG. 10 is a schematic view of a balancer which uses the air spring device in the first embodiment of the present invention.

Further, FIG. 10 shows a configuration example of a balancer device 31 which uses the first air spring device 1a of the first embodiment. The balancer device 31 shown in FIG. 10 is configured such that a hook 32 as one example of a holding part is coupled to the first connector 14a of the first air spring device 1a, and the first connector 14a can be elevated or lowered in a state where an object is suspended from the hook 32.

With such a configuration, the object can be elevated or lowered in a state where a weight of the object suspended from the hook 32 is compensated by a generating force of the first air spring device 1a.

With such a configuration, by adjusting an amount of air in the first air spring 3 of the first air spring device 1a, it is possible to obtain the balancer device 31 which can easily cope with a change in weight of an object in a broad range, can successively maintain a characteristic that suction/discharge of air associated with a change in position of the object is unnecessary, and can elevate or lower the object with small energy.

The method of configuring the balancer device 31 is not limited to a method in which the hook 32 is used as one example of the holding part. The combination of any known techniques may be used provided that such combination can realize the same function.

Figure 11:
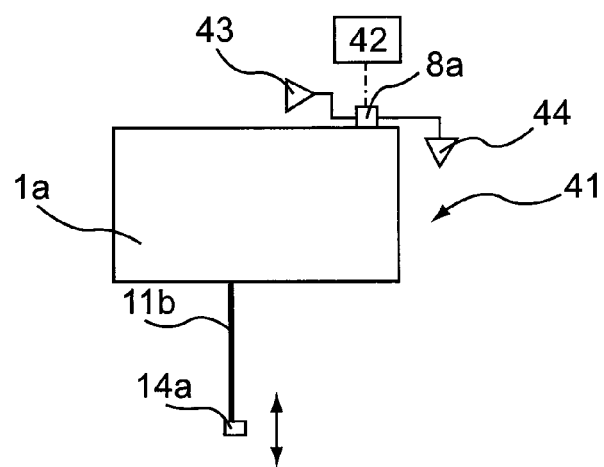
FIG. 11 is a schematic view of a pneumatic actuator which uses the air spring device in the first embodiment of the present invention.

Further, FIG. 11 shows a configuration example of a pneumatic actuator 41 as one example of a gas pressure actuator using the first air spring device 1a of the first embodiment. In the pneumatic actuator 41 shown in FIG. 11, a valve controller 42 as one example of a control device is connected to a first suction/discharge valve 8a of the first air spring device 1a. When a force increasing instruction is given, the valve controller 42 releases the first suction/discharge valve 8a to a pressure source 43. When a force decreasing instruction is given to the valve controller 42, the valve controller 42 releases the first suction/discharge valve 8a to an atmospheric pressure release port 44. When neither of the above-mentioned instructions is given, the valve controller 42 closes the first suction/discharge valve 8a so that an amount of air in the first inner space 21 is maintained.

With such a configuration, a generating force of the pneumatic actuator 41 can be desirably changed in response to an instruction from the valve controller 42.

Further, with such a configuration, by adjusting an amount of air in the first inner space 21 of the first air spring 3 of the first air spring device 1a, it is possible to obtain the pneumatic actuator 41 which can easily cope with a change in weight of an object in a broad range, can successively maintain a characteristic that suction/discharge of air associated with a change in position of the object is unnecessary, and can continuously apply any force to the object with small energy.

The pneumatic actuator 41 can be used not only as a linear actuator but also as a rotary actuator.

Figure 12:
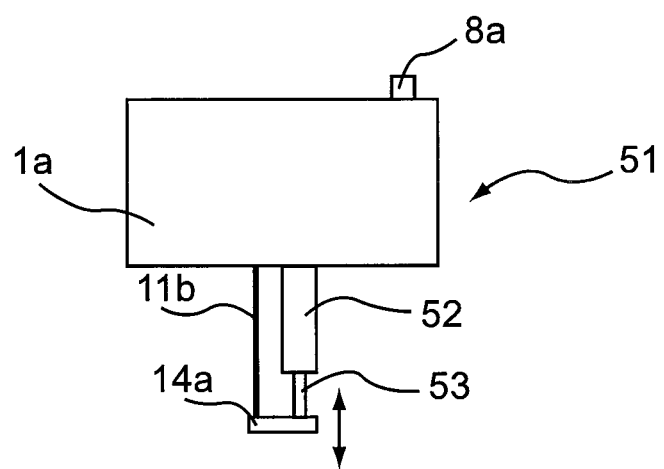
FIG. 12 is a schematic view of a gravity compensating actuator which uses the air spring device in the first embodiment of the present invention.

Further, FIG. 12 shows a configuration example of a bias load compensating actuator 51 which uses the first air spring device 1a of the first embodiment. In the bias load compensating actuator 51 shown in FIG. 12, a linear actuator 52 as one example of an actuator is additionally arranged parallel to the first air spring device 1a, and a generating force of the first air spring device 1a can be combined with a generating force of the linear actuator 52.

With such a configuration, when the linear actuator 52 moves a load to which a bias load such as gravity is applied by elevating or lowering a rod 53, it is possible to operate the bias load compensating actuator 51 in a state where an assist force corresponding to a bias load is applied to the rod 53 from the first air spring device 1a by way of the first connector 14a.

With such a configuration, by adjusting an amount of air in the first air spring 3 of the first air spring device 1a, it is possible to obtain the bias load compensating actuator 51 which can easily cope with a bias load in a broad range, can successively maintain a characteristic that suction/discharge of air in accordance with the displacement of the actuator is unnecessary, and can move a load to which the bias load is applied with small energy.

The method of configuring the bias load compensating actuator is not limited to the method which uses the linear actuator, and the method is also applicable to a rotary actuator.

(Second Embodiment)

Figure 13:
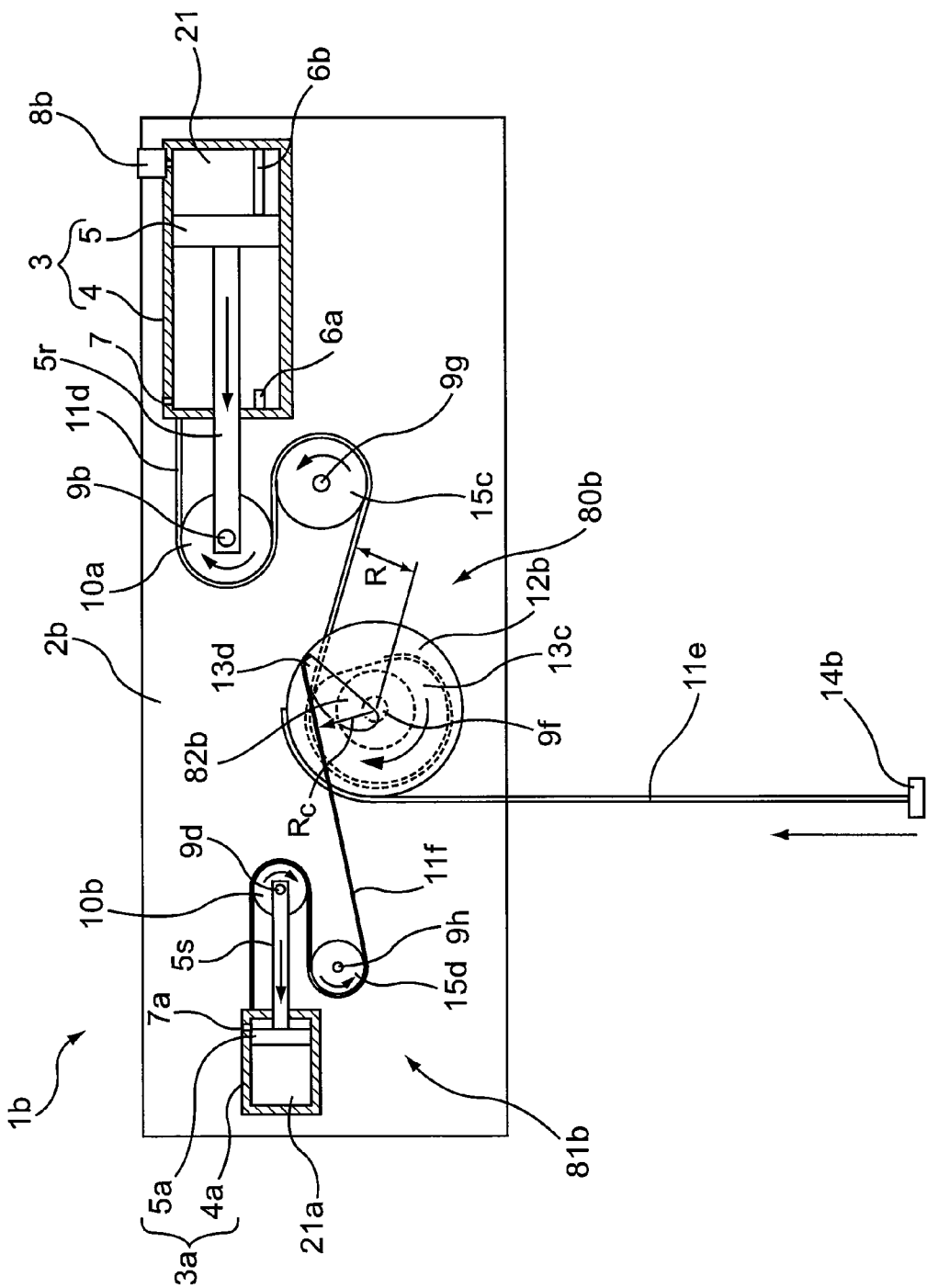
FIG. 13 is a schematic partial cross-sectional view of an air spring device according to a second embodiment of the present invention in a compressed state.
Figure 14:
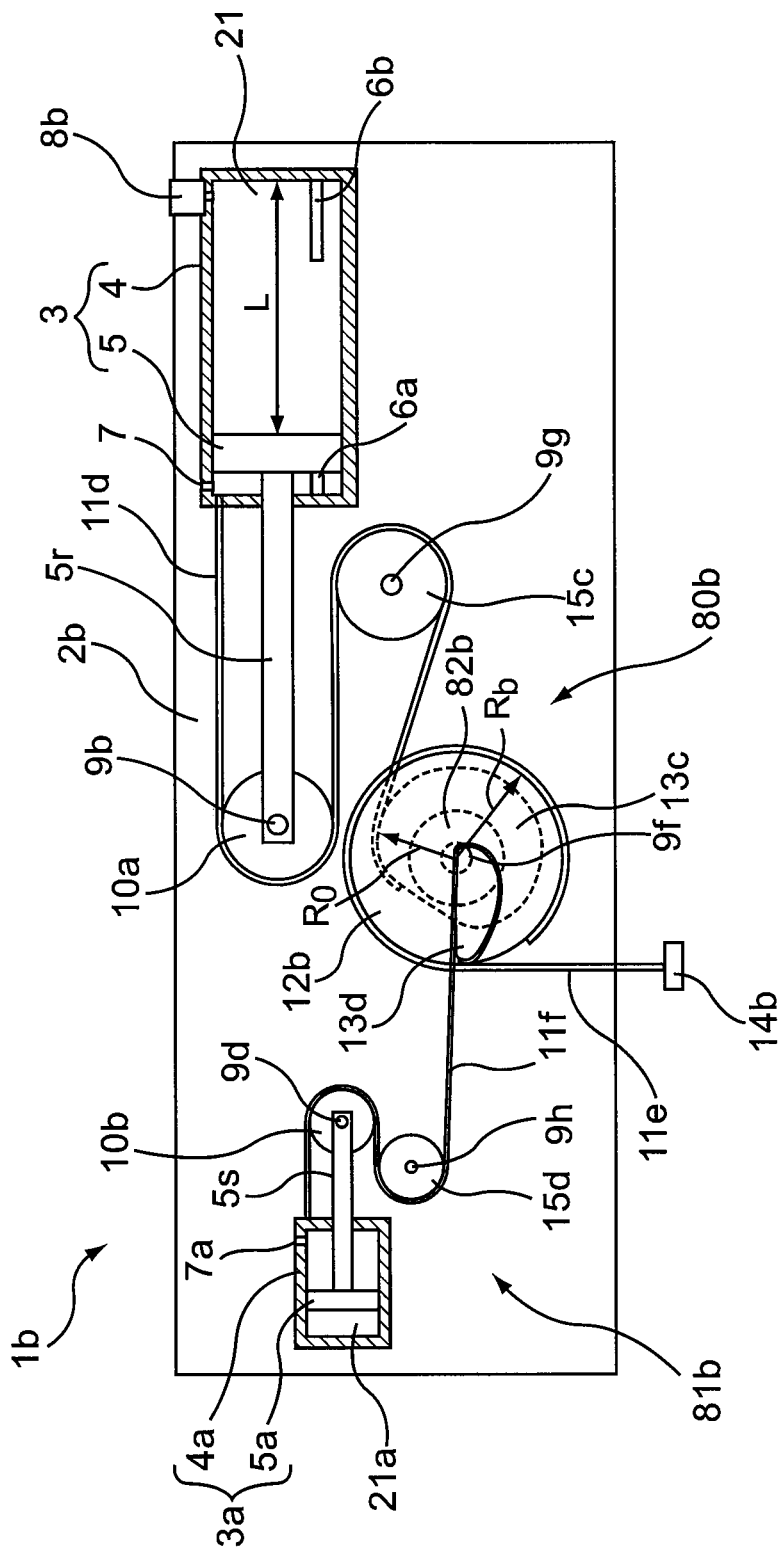
FIG. 14 is a schematic partial cross-sectional view of the air spring device according to the second embodiment of the present invention in an expanded state.

FIG. 13 schematically shows a second air spring device 1b according to a second embodiment of the present invention in a compressed state. FIG. 14 schematically shows the second air spring device 1b according to the second embodiment of the present invention in an expanded state. Note that, parts having the same configuration as those of the first embodiment are given same reference numerals.

The second air spring device 1b includes: a first air spring 3 as one example of a gas spring; a second circular disk member 12b as one example of a rotary body; a second speed change part 80b; a second torque compensating part 81b; and a second connector 14b as one example of a second displacement part.

The first air spring 3 is configured by a first cylinder 4 and a first piston 5. A first through hole 7 and a second suction/discharge valve 8b as one example of a suction/discharge part are provided on the first cylinder 4.

The second speed change part 80b is configured by a third non-circular disk member 13c as one example of a third non-true-circular disk, a third steel belt 11d as one example of a third flexible coupling member, and a second coupling plate 82b as one example of a second transmitting part. The second speed change part 80b converts a generating force of the first air spring 3 transmitted to the third non-circular disk member 13c through the third steel belt 11d into a torque at an arbitrary ratio, and transmits the torque to the second coupling plate 82b.

The second torque compensating part 81b is configured by: a second air spring 3a as one example of an elastic body; a fourth non-circular disk member 13d as one example of a fourth non-true-circular disk; and a sixth steel belt 11f as one example of a first flexible coupling member. Although described in detail later, the second torque compensating part 81b sets a torque applied to the fourth non-circular disk member 13d to substantially 0 when an amount of gas in a first inner space 21 of the first air spring 3 is set to a predetermined value.

In the second air spring device 1b shown in FIG. 13, a second frame 2b is a plate-like member. The first air spring 3 as one example of the gas spring is fixed to the second frame 2b. The first air spring 3 is configured by the first cylinder 4 and the first piston 5. For example, the first piston 5 is arranged in a reciprocating manner in the lateral direction, and a stroke of the first piston 5 is restricted by stoppers 6a, 6b provided at both ends of the inside of the first cylinder 4. The first through hole 7 and the second suction/discharge valve 8b as one example of the suction/discharge part are respectively formed on both ends of the first cylinder 4. The second suction/discharge valve 8b serves as a connecting port which is connected with a pressure source (see, e.g., reference numeral 43 in FIG. 11) through the first suction/discharge valve 8a when an amount of air in the first inner space 21 of the first cylinder 4 is to be increased, and serves as a discharge port for discharging air to the surrounding atmosphere through the first suction/discharge valve 8a when the amount of air in the first inner space 21 is to be decreased. However, in other cases, the first suction/discharge valve 8a is closed, thus continuously maintaining the amount of air in the first inner space 21. A force which is proportional to a differential pressure between an air pressure in the first inner space 21 and an atmospheric pressure maintained by the first through hole 7 is applied to the first piston 5, and pushes a second shaft 9b provided on a distal end of a piston rod 5r of the first piston 5. A first movable pulley 10a is rotatably coupled to the second shaft 9b. The third steel belt 11d and the third non-circular disk member 13c which serve as one example of a second speed change part 80b are coupled to the first cylinder 4. The third steel belt 11d as one example of a third flexible coupling member has one end thereof fixed to the first cylinder 4 and the other end thereof fixed to the third non-circular disk member 13c as one example of a third non-true-circular disk. The third steel belt 11d is wound around a first movable pulley 10a, a third pulley 15c, and the third non-circular disk member 13c. The third pulley 15c is rotatably coupled to a seventh shaft 9g fixed to the second frame 2b, and is configured so as not to obstruct the displacement of the third steel belt 11d. The third non-circular disk member 13c is rotatably coupled to a sixth shaft 9f fixed to the second frame 2b. To the third non-circular disk member 13c, a second circular disk member 12b as one example of a rotary body is fixed by way of a circular-disk-shaped second coupling plate 82b as one example of a second transmitting part which is arranged between the third non-circular disk member 13c and the second circular disk member 12b. The shape of the second coupling plate 82b is not limited to a circular disk shape and any shape can be used. The second coupling plate 82b is configured to transmit to the second circular disk member 12b a torque applied to the third non-circular disk member 13c due to a tension of the third steel belt 11d. The third non-circular disk member 13c and the second circular disk member 12b integrally rotate about the sixth shaft 9f. With such a configuration, a torque about the sixth shaft 9f is applied to the second circular disk member 12b due to a generating force of the first air spring 3.

One end of a fifth steel belt 11e is fixed to and wound around the second circular disk member 12b. The other end of the fifth steel belt 11e is provided with a second connector 14b as one example of a second displacement part, and the second connector 14b can be coupled to an external load. With such a configuration, the second connector 14b is displaced in conjunction with a rotary movement of the second circular disk member 12b.

Moreover, a fourth non-circular disk member 13d as one example of the second torque compensating part 81b, a sixth steel belt 11f, and the second air spring 3a are coupled to the second circular disk member 12b. The fourth non-circular disk member 13d as one example of the fourth non-true-circular disk is fixed to the second circular disk member 12b by way of a second coupling plate 82b as one example of the second transmitting part which has the same shape as the fourth non-circular disk member 13d. The fourth non-circular disk member 13d, the second circular disk member 12b, and the third non-circular disk member 13c integrally rotates about the sixth shaft 9f. The sixth steel belt 11f as one example of the first flexible coupling member has one end thereof fixed to the fourth non-circular disk member 13d, and is wound around the fourth non-circular disk member 13d. The other end of the sixth steel belt 11f is coupled to a second cylinder 4a as a second air spring 3a as one example of an elastic body. The second air spring 3a is configured by the second cylinder 4a and a second piston 5a. For example, the second piston 5a is also arranged in a reciprocating manner in the lateral direction. To the second piston 5a, a force is applied which is proportional to a differential pressure between an air pressure in a closed second inner space 21a of the second cylinder 4a and an atmospheric pressure which is maintained through a first through hole 7a formed in the second cylinder 4a on a second piston rod 5s side, and the force pushes a fourth shaft 9d provided on a distal end of the second piston rod 5s of the second piston 5a. A second movable pulley 10b is rotatably coupled to the fourth shaft 9d. The sixth steel belt 11f is coupled between the second cylinder 4a and the fourth non-circular disk member 13d in a state of being wound around the second movable pulley 10b and a fourth pulley 15d. The fourth pulley 15d is rotatably coupled to an eighth shaft 9h fixed to the second frame 2b so that the displacement of the sixth steel belt 11f is not obstructed. In FIG. 13, as one example, with respect to the arrangement relationship of a shaft 9b or the like, a second shaft 9b and a seventh shaft 9g are arranged in this order downwardly from above on one side of the sixth shaft 9f, for example, on the right side of the sixth shaft 9f, and the fourth shaft 9d and the eighth shaft 9h are arranged in this order downwardly from above on the other side of the sixth shaft 9f, for example, on the left side of the sixth shaft 9f.

Next, the operation of the second air spring device 1b will be described.

In the state shown in FIG. 13, due to a generating force of the first air spring 3, the first piston 5 moves in the left direction in FIG. 13 and the first movable pulley 10a rotates in the clockwise direction so that a tension is generated in the third steel belt 11d. Thus, a torque in the clockwise direction is applied to the third non-circular disk member 13c. In addition, due to a generating force of the second air spring 3a, the second piston 5a moves in the right direction in FIG. 13 and the second movable pulley 10b rotates in the counterclockwise direction so that a tension is generated in the sixth steel belt 11f. Thus, a torque in the counterclockwise direction is generated in the fourth non-circular disk member 13d. The second circular disk member 12b, the third non-circular disk member 13c, and the fourth non-circular disk member 13d rotate integrally about the sixth shaft 9f. Hence, a combined torque obtained by a torque in the clockwise direction generated by the first air spring 3 and a torque in the counterclockwise direction generated by the second air spring 3a is transmitted to the second circular disk member 12b. To the fifth steel belt 11e wound around the second circular disk member 12b, a tension is applied which is obtained by dividing the combined torque by a distance Rb from the center of the sixth shaft 9f to a fifth steel belt 11e, and a force in the upward direction in FIG. 13 is applied to the second connector 14b.

Before the state shown in FIG. 13 is changed to the state shown in FIG. 14 due to the expansion of air in the first inner space 21 of the first air spring 3, the respective constituent elements move or rotate in the directions indicated by arrows shown in FIG. 13. Energy which is lost due to the expansion of air in the first inner space 21 of the first air spring 3 is used for moving a load by way of the second connector 14b and for compressing the second air spring 3a.

Hereinafter, forces and torques generated when the second air spring device 1b is operated will be described.

In the second embodiment, a tension $F_2$ applied to the fifth steel belt 11e is set to have a linear spring characteristic expressed by $F_2=R_0(1+KZ)/(P_0-P_a)A/(2R_b)$. Here, $P_0$ indicates a pressure in the first inner space 21 when a volume of the first inner space 21 is AL, in terms of absolute pressure. $P_a$ is an atmospheric pressure. A is a cross-sectional area of the first piston 5. $R_0$ is a distance from the center of the first shaft 9a to the center of the thickness of the second steel belt 11b in the state shown in FIG. 14. $R_b$ is a radius of the second circular disk member 12b. K is a constant corresponding to spring stiffness which is a linear spring characteristic realized by the second air spring device 1b. Z is the displacement of the second connector 14b. As the constant K becomes larger, a change in the tension $F_2$ becomes larger when the displacement Z changes. Assuming that the displacement of the second connector 14b in FIG. 14 is Z=0, it is defined that the displacement Z further increases as the second connector 14b is further displaced downward from the position of Z=0. Assume that the displacement of the second connector 14b shown in FIG. 13 is $Z=Z_{max}$. That is, when X=0, the displacement Z becomes Z=0, and when $X=X_{max}$, the displacement Z becomes $Z=Z_{max}$. With respect to a moving speed of the second connector 14b when the second air spring device 1b is used, as one example, by selecting a low speed (for example, approximately 3 cm/s) such that a change of the first air spring 3 is considered as an isothermal change, the performance of the second air spring device 1b becomes stable.

The relationship between the constant K and the displacement Z can be obtained as follows. A work which is performed for moving the second connector 14b from 0 to Z is expressed by $R_0Z(1+KZ/2)(P_0-P_a)A/R_b$. Assuming that the first air spring 3 is operated in an isothermal process, a generating force $F_s$ of the first air spring 3 is expressed by $F_s=(P_0/(1-X)-P_a)A$. In the second embodiment, a torque which balances with a torque $T_s$ due to the generating force $F_s$ of the first air spring 3 with an amount of air in the first inner space 21 which brings the pressure $P_0=P_a$ is applied to the second circular disk member 12b due to a generating force of the second air spring 3a. Accordingly, a generating force when the first air spring 3 and the second air spring 3a are regarded as one air spring is expressed by $F_s-(X/(1-X))P_aA=(1/(1-X))(P_0-P_a)A$. A work performed for moving this air spring from 0 to X is expressed by $-(P_0-P_a)AL\ln(1-X)$, assuming that a volume of the first inner space 21 shown in FIG. 14 is expressed as AL. If two works are equal, the displacement Z is expressed by $Z=(-1+\text{sqrt}(1-2KR_bL\ln(1-X)/R_0))/K$. To realize such relationship between Z and X, the third non-circular disk member 13c is configured by a rotatable plate-like member having a curved side surface formed of a group of a plurality of arcs each having a different radius of curvature, and the third steel belt 11d makes contact with and is wound around the curved side surface due to the rotation of the plate-like member. More specifically, the shape of the third non-circular disk member 13c is formed such that a distance (radius) R from the center of the sixth shaft 9f to a contact point where the third steel belt 11d makes contact with the curved side surface of the third non-circular disk member 13c is as a tangent expressed by $R=R_0(1+KZ)(1-X)$. The displacement Z can be also expressed by $Z=-R_b\theta$ using a rotational angle θ of the second circular disk member 12b. Here, the rotational angle θ is defined such that the rotational angle of the second circular disk member 12b shown in FIG. 14 is set to θ=0, and that the rotational angle θ becomes smaller as the second circular disk member 12b further rotates in the counterclockwise direction from the position of θ=0. That is, when Z=0, the rotational angle θ becomes θ=0, and when $Z=Z_{max}$, the rotational angle θ becomes $θ=-θ_{max}$. Here, $θ_{max}=Z_{max}/R_b$. The relationship between the distance R and the rotational angle θ can be obtained using the above-mentioned relationship.

Although FIG. 3 is the view used for describing the first embodiment, FIG. 3 also shows the relationship between the displacement X and the generating force $F_s$ of the first air spring 3 according to the second embodiment of the present invention. Also in the second embodiment, the same first air spring 3 used in the first embodiment of the present invention is used. As the position (displacement) X of the first piston 5 becomes greater, the volume of the first inner space 21 becomes smaller and the pressure in the first inner space 21 becomes larger. The second embodiment describes the case where the position X of the first piston 5 in FIG. 1 is at a maximum value, that is, $X=X_{max}=0.7$. However, the present invention is not limited thereto. As one example, $X_{max}$ can practically take a value which falls within a range of 0.3 to 0.9. In FIG. 3, the generating force $F_s$ of the first air spring 3 is indicated by normalizing the generating force $F_s$ by $P_aA$. It is understood from FIG. 3 that the generating force of the first air spring 3 greatly changes corresponding to the position of the first piston 5. As one example, when the pressure $P_0$ is set to approximately $P_a$ to $7P_a$, the pressure is low, and there is an advantage that the handling of the first air spring 3 as a pneumatic device is facilitated. On the other hand, as one example, when the pressure $P_0$ is set to approximately $30P_a$ to $80P_a$, there is an advantage that the first air spring 3 can be miniaturized.

Figure 15:
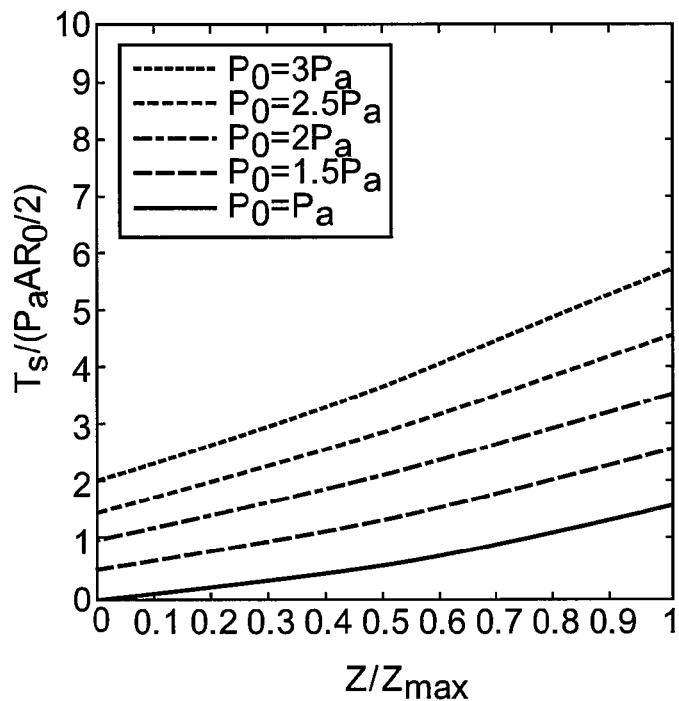
FIG. 15 is a graph showing the relationship between a displacement of a connector and a torque due to a generating force of a first air spring which is applied to a circular disk member in the second embodiment of the present invention.

FIG. 15 shows the relationship between the displacement of a second connector 14b and a torque $T_s$ due to a generating force of the first air spring 3 applied to the second circular disk member 12b in the second embodiment of the present invention. By setting a value of the torque $T_s$ in the clockwise direction as a positive value, the torque $T_s$ is expressed by $T_s=F_sR/2=R_0(1+KZ)(P_0-(1-X)P_a)A/2$. In the second embodiment, a stroke of the first air spring 3 is increased twice using the first movable pulley 10a and hence, the torque $T_s$ is expressed by $T_s=F_sR/2$. The second embodiment describes the case where K=1.5, and $R_bL/R_0=1$. In FIG. 15, the torque $T_s$ is normalized by $P_aAR_0/2$, and the displacement Z is normalized by $Z_{max}$.

Figure 16:
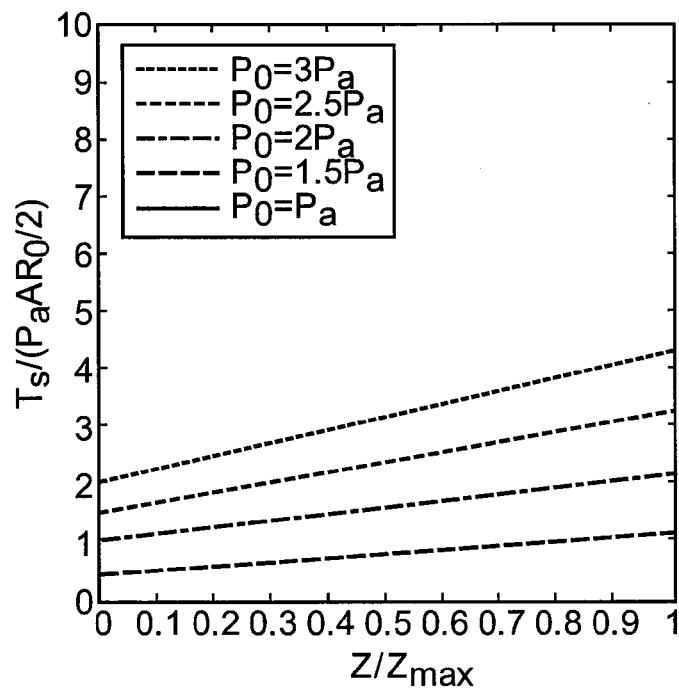
FIG. 16 is a graph showing the relationship between a displacement of the connector and a torque due to generating forces of the first air spring and a second air spring which are applied to the circular disk member in the second embodiment of the present invention.

FIG. 16 shows the relationship between the displacement of the second connector 14b and a torque $T_s+T_c$ due to generating forces of the first air spring 3 and the second air spring 3a applied to the second circular disk member 12b in the second embodiment of the present invention. Also in the second embodiment, a torque which balances with a torque $T_s$ due to the generating force $F_s$ of the first air spring 3 with an amount of air in the first inner space 21 where the pressure $P_0$ is $P_0=P_a$ is applied to the second circular disk member 12b due to the generating force of the second air spring 3a. That is, assuming that a torque applied to the second circular disk member 12b due to the generating force of the second air spring 3a is $T_c$, the torque $T_c$ is expressed by $T_c=-R_0(1+KZ)XP_aA/2$. Accordingly, by setting a value of the torque $T_s+T_c$ in the clockwise direction as a positive value, the torque $T_s+T_c$ is expressed by $T_s+T_c=R_0(1+KZ)(P_0-P_a)A/2$. In FIG. 16, the torque $T_s+T_c$ is normalized by $P_aAR_0/2$, and the displacement Z is normalized by $Z_{max}$. It is confirmed from FIG. 16 that the torque $T_s+T_c$ at $P_0=P_a$ becomes 0 by the second torque compensating part 81b. Although an ideal state is described herein with respect to the torque $T_c$, actually, the deviation of approximately 2% may take place with respect to the torque $T_c$ due to an error in the manufacture of the air spring device. However, such deviation causes no problem in practical use. Accordingly, in this specification, such a state is referred to as a state where the torque becomes 0. Actually, however, it is safe to say that such a state refers to substantially 0 including an error in manufacture of the air spring device. The target to be compared herein, is the relationship between center values of the torque $T_s$ and the torque $T_c$ from which hysteresis components such as frictional resistances are removed. It is understood from FIG. 16 that, in the second embodiment, the force $F_2$ applied to the second connector 14b can be adjusted in a broad range by changing the pressure $P_0$. It is also understood from FIG. 16 that even when the value of the pressure $P_0$ changes, a characteristic of a linear spring corresponding to the position of the second connector 14b can be maintained. With respect to a moving speed of the second connector 14b when the second air spring device 1b is used, as one example, by selecting a low speed (for example, approximately 3 cm/s) such that a change of the first air spring 3 is considered as an isothermal change, the performance of the second air spring device 1b becomes stable.

The torque $T_c$ is a torque which does not depend on the pressure $P_0$ and hence, a shape of the fourth non-circular disk member 13d is formed such that a torque $F_cR_c/2$ which is obtained by multiplying a value obtained by dividing the generating force $F_c$ of the second air spring 3a by 2 at each rotational angle $\theta$ by a distance $R_c$ from the center of the sixth shaft 9f to the center of the thickness of the sixth steel belt 11f becomes equal to the torque $T_c$. That is, the fourth non-circular disk member 13d is configured by a rotatable plate-like member having a curved side surface formed of a group of a plurality of arcs each having a different radius of curvature, and the sixth steel belt 11f can make contact with and wound around the curved side surface due to the rotation of the plate-like member. With such a configuration, it is possible to realize the second torque compensating part 81b which generates the torque $T_c$. The generating force $F_c$ is divided by 2 because, in the second embodiment, a stroke of the second air spring 3a is increased twice with the use of the second movable pulley 10b. Various factors or elements and the generating force $F_c$ of the second air spring 3a depend only on the property of the first air spring 3 and can be obtained in the same manner as in the first embodiment. Accordingly, the torque $T_c$ and the generating force $F_c$ at each rotational angle $\theta$ can be obtained and hence, a distance $R_c$ from the center of the sixth shaft 9f to the center of the thickness of the sixth steel belt 11f can be obtained from $R_c=2T_c/F_c$.

The shape of the third non-circular disk member 13c and the shape of the fourth non-circular disk member 13d will be further described. As described above, the shape of the third non-circular disk member 13c is a shape in which a distance from the center of the sixth shaft 9f to the center of the thickness of the third steel belt 11d when a rotational angle of the second circular disk member 12b is $\theta$ becomes the distance R which is a function of the rotational angle $\theta$. The shape of the fourth non-circular disk member 13d is a shape in which a distance from the center of the sixth shaft 9f to the center of the thickness of the sixth steel belt 11f when a rotational angle of the second circular disk member 12b is $\theta$ becomes the distance $R_c$ which is a function of the rotational angle $\theta$. The shape of the third non-circular disk member 13c becomes a curve which makes contact with all common tangents when a common tangent is drawn between a circle having the radius R which is coaxial with the sixth shaft 9f and a pitch circle of the third pulley 15c at the respective rotational angles $\theta$. In the same manner, the shape of the fourth non-circular disk member 13d becomes a curve which makes contact with all common tangents when a common tangent is drawn between a circle having the radius $R_c$ which is coaxial with the sixth shaft 9f and a pitch circle of the fourth pulley 15d at the respective rotational angles $\theta$. The shape obtained in the above-mentioned manner is a shape corresponding to the pitch circle of the pulley and hence, a shape to be actually formed becomes a shape which is offset by a half of thickness of the steel belt in the normal direction on a center-of-rotation side.

Figure 17A:
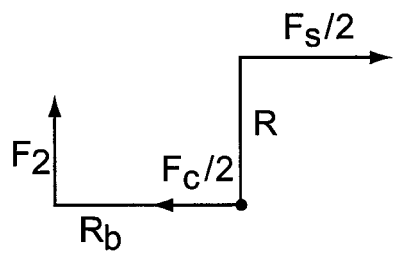
FIG. 17A is a view showing a state of a torque applied to the circular disk member when $\theta=0$ in the second embodiment of the present invention.
Figure 17B:
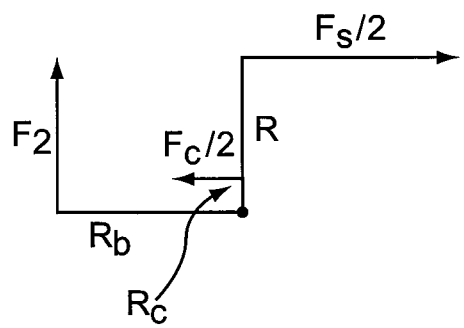
FIG. 17B is a view showing a state of a torque applied to the circular disk member when $\theta=-\theta_{max}/2$ in the second embodiment of the present invention.
Figure 17C:
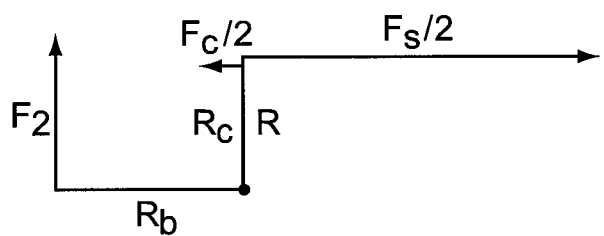
FIG. 17C is a view showing a state of a torque applied to the circular disk member when $\theta=-\theta_{max}$ in the second embodiment of the present invention.

States of a torque applied to the second circular disk member 12b are shown in FIG. 17A, FIG. 17B, and FIG. 17C. FIG. 17A, FIG. 17B, and FIG. 17C show states where $\theta=0$, $-\theta max/2$, $-\theta_{max}$, respectively. To facilitate the understanding, the direction in which a force is applied is expressed as the horizontal direction or the vertical direction. Here, the radius $R_b$ is set as constant values which do not depend on the rotational angle θ. The tension $F_2$ becomes larger as the rotational angle θ is smaller, thus realizing the linear spring characteristic. Accordingly, a value when the rotational angle θ is $θ=-θ_{max}/2$ assumes an intermediate value between a value when $θ=0$ and a value when $θ=-θ_{max}$. As can be understood from FIG. 17A, FIG. 17B, and FIG. 17C, the first air spring 3 is further compressed as the rotational angle θ is smaller, and a tension $F_s/2$ applied to the third steel belt 11d is increased, and a torque in the clockwise direction due to a generating force of the first air spring 3 is increased. On the other hand, the air in the second inner space 21a of the second air spring 3a is further expanded as the rotational angle θ is smaller and hence, a tension $F_c/2$ applied to the sixth steel belt 11f is decreased. It is also understood that, due to the shape of the fourth non-circular disk member 13d, the distance $R_c$ is increased such that a torque $T_c$ in the counterclockwise direction is generated which balances with a torque $T_s$ due to a generating force $F_s$ of the first air spring 3 with an amount of air in the first inner space 21 where the pressure $P_0$ is $P_0=P_a$. In this manner, although the tension $F_c/2$ becomes smaller as the rotational angle θ becomes smaller, the torque $T_c$ in the counterclockwise direction is increased. Then, finally, the tension $F_2$ obtained by dividing the combined torque $T_s+T_c$ in the clockwise direction by the distance $R_b$ is applied to the fifth steel belt 11e, thus realizing the linear spring characteristic.

According to the configuration of the second embodiment, by applying to the second circular disk member 12b a torque due to a generating force of the first air spring 3 and a torque due to the second air spring 3a, it is possible to apply to the second connector 14b a force which changes corresponding to an amount of air in the first inner space 21 of the first air spring 3 while maintaining a linear spring characteristic defined by the third non-circular disk member 13c. That is, according to the second embodiment, a generating force can be easily changed by adjusting an amount of air in the first inner space 21 of the first air spring 3, and a linear spring force corresponding to a position of the second connector 14b can be generated while maintaining the amount of air in the first inner space 21 of the first air spring 3 constant. Accordingly, it is possible to obtain the second air spring device 1b which can easily cope with a change in load weight in a wide range, and in which suction/discharge of a gas associated with a change in position is unnecessary.

In the second embodiment, air is used as a working gas for the first air spring 3 and the second air spring 3a. However, the present invention is not limited thereto, and various gases which are considered as ideal gases can be used. As one example, air has an advantage that it can be obtained easily. As another example of the working gas, an inert gas such as nitrogen has an advantage that properties of the inert gas are stable.

In the second embodiment, the displacement of the first air spring 3 and the displacement of the second air spring 3a are increased twice using the movable pulley. However, the present invention is not limited thereto, and the steel belt 11d, 11f may be directly fixed to a distal end of the first or second piston rod 5r, 5s. Further, as one example of the second speed change part 80b, even when the displacement of the first air spring 3 or the second air spring 3a is converted with arbitrary magnification using arbitrary known stroke conversion mechanism, such displacement can be obtained in the same manner. Although the first air spring 3 and the second air spring 3a are configured to generate a force in the direction in which these air springs 3, 3a extend, the present invention is not limited thereto, and the first air spring 3 and the second air spring 3a may be configured to generate a force in the direction in which these air springs 3, 3a retract.

In the second embodiment, the second air spring 3a is used as an elastic body. However, the present invention is not limited thereto, and the second embodiment can be carried out using any one of various metal springs, magnetic springs, or arbitrary known elastic bodies. The shape of the fourth non-circular disk member 13d can be obtained in the same manner by replacing a change in exergy of the second air spring 3a with a change in elastic energy of each elastic body.

In the second embodiment, the second connector 14b is displaced in conjunction with the rotation of the second circular disk member 12b by interposing the steel belt 11c therebetween. However, the present invention is not limited thereto, and it can be performed using any one of known linear movement-rotation conversion such as a rack and pinion mechanism.

In the second embodiment, a stroke of the first piston 5 is limited by the stoppers provided on the inner portion of the cylinder. However, the present invention is not limited thereto, and the stroke of the first piston 5 can be limited in the same manner also by stoppers which are provided on an outer portion of the cylinder, a stopper which limits a rotational angle of the second circular disk member 12b, or a stopper which limits the displacement of the second connector 14b.

In the second embodiment, the steel belt is used as one example of the flexible coupling member. However, the present invention is not limited thereto, and the flexible coupling member may be formed in the same manner using a belt made of a material other than metal or a strip-like member such as a wire rope. When the strip-like member is used, as one example, a groove for preventing falling of the strip-like member is formed on outer peripheries of the second circular disk member 12b, the third non-circular disk members 13c, 13d, the first movable pulleys 10a, 10b, and the third pulleys 15c, 15d which correspond to the strip-like member respectively. Further, when the strip-like member is used, a rotational angle of the second circular disk member 12b is not limited to less than one rotation. That is, by forming the second circular disk member 12b into a drum-like rotary body and by forming the third non-circular disk members 13c, 13d into a rotary body provided with a conically spiral groove, the second circular disk member 12b may be rotated a plurality of times.

In the second embodiment, the second circular disk member 12b and the third non-circular disk members 13c, 13d are integrally and coaxially rotated with each other. However, the present invention is not limited thereto. That is, the integral rotation of these members can be carried out provided that these members are rotated in conjunction with each other and hence, these members may be rotated about different axes by coupling these members to each other by gears, belts, or the like.

In the second embodiment, the final output is the linear movement of the second connector 14b. However, the present invention is not limited thereto, and the final output may be the rotary movement which is obtained by using an arbitrary known linear movement-rotation conversion mechanism, or by directly coupling the second circular disk member 12b to an external load. In this case, the displacement part becomes a part which performs the rotary movement and hence, a torque which changes linearly with respect to the angular displacement of the displacement part in conjunction with the second circular disk member 12b can be taken outside.

In the second embodiment, the torque $T_s$ with an amount of air in the first inner space 21 which brings the pressure $P_0$ to $P_0=P_a$ is compensated by the second torque compensating part 81b. However, the present invention is not limited thereto. For example, the torque compensation can be performed in the same manner also by compensating a torque with an amount of air which brings the pressure $P_0=\alpha P_a$ ($\alpha$: any value of 1 or more) by the second torque compensating part 81b. In this case, the torque $T_s+T_c$ is expressed by $T_s+T_c=R_0(1+KZ)(P_0-\alpha P_a)A/2$ and hence, the second torque compensating part 81b can be used as a linear spring when $P_0=\alpha P_a$ or more.

In the second embodiment, a characteristic of a linear spring is realized by the third non-circular disk member 13c and the third steel belt 11d. However, the present invention is not limited thereto, and a spring characteristic which differs from a spring characteristic of a linear spring may be used by changing a shape of the third non-circular disk member 13c.

(Third Embodiment)

FIG. 18 schematically shows a composite air spring device 1c as one example of a composite gas spring device according to the third embodiment of the present invention. In FIG. 18, a base 61 is formed of a plate-like member. The second frame 2b of the second air spring device 1b according to the second embodiment and the first frame 2a of the first air spring device 1a according to the first embodiment are fixed to upper and lower sides of the base 61. A first connector 14a of the first air spring device 1a is coupled to a second connector 14b of the second air spring device 1b from a side opposite to the second connector 14b (for example, in FIG. 18, the first connector 14a is coupled from the lower side to the second connector 14b arranged on the upper side), and the first connector 14a and the second connector 14b are integrally formed with each other. To the first connector 14a and the second connector 14b which are integrally formed in this manner, a force is applied which is obtained by subtracting a generating force of the first air spring device 1a from a generating force of the second air spring device 1b such that the force acts in the upward direction in FIG. 18. At this time, a distance between the first frame 2a and the second frame 2b is set such that a movable range of the first connector 14a and a movable range of the second connector 14b overlap with each other.

Next, the operation of the composite air spring device 1c will be described.

A force by an amount of $R_0(1+KZ)(P_0-P_a)A/(2R_b)$ is applied to the second connector 14b in the upward direction shown in FIG. 18 by the second air spring device 1b. A force by an amount of $(P_0-P_a)AR_d/(2R_0)$ is applied to the first connector 14a in the downward direction shown in FIG. 18 by the first air spring device 1a. Meanings of the respective symbols are equal to the contents described in conjunction with the first embodiment and the second embodiment. In the second embodiment, the description has been made with respect to the case where $R_0/(2R_b)$ of the second air spring device 1b and $R_d/(2R_0)$ of the first air spring device 1a are equally set to 1, and a force which is applied to the first connector 14a and the second connector 14b integrally formed with each other becomes $KZ(P_0-P_a)A$ in the upward direction in FIG. 18. Here, $P_0$ and A of the first air spring device 1a are equal to $P_0$ and A of the second air spring device 1b. With such a configuration, while keeping, always at 0, the force applied to the first connector 14a and the second connector 14b integrally formed with each other in a state where Z=0 in the second air spring device 1b, only a spring constant of a linear spring can be changed by adjusting pressure $P_0$. Although characteristics of the first air spring device 1a and the second air spring device 1b are described with respect to an ideal state, actually, even when the deviation of approximately 2% may take place with respect to a center value of the torque $T_c$ in the respective air spring devices due to an error in manufacture, such deviation causes no problem in practical use. In this manner, by combining a plurality of air spring devices with each other, it is possible to realize an air spring device having new characteristic where a generating force is adjustable based on the pressure $P_0$. Further, in the third embodiment, the pressure $P_0$ in the first air spring device 1a is set equal to the pressure $P_0$ in the second air spring device 1b. However, by adjusting the respective pressures $P_0$ individually and independently from each other, the degree of influence which the first air spring device 1a and the second air spring device 1b exert on the characteristic of the composite air spring device 1c can be adjusted respectively and hence, it is possible to adjust not only a generating force of the composite air spring device 1c but also the characteristic itself of the composite air spring device 1c.

In the third embodiment, as the manner of combining two air spring devices 1a, 1b, a constant load spring characteristic and a linear spring characteristic are combined with each other. However, the present invention is not limited thereto, and the third embodiment can be carried out in the same manner by combining any other characteristics.

Though the present disclosure has been described above based on the above first to third embodiments, the present disclosure should not be limited to the above-described first to third embodiments.

By properly combining the arbitrary embodiment(s) or modification(s) of the aforementioned various embodiments and modifications, the effects possessed by the embodiment(s) or modification(s) can be produced.

The gas spring device, and the balancer device and the actuator which use the gas spring device according to the present invention can easily cope with a change in a load weight by adjusting an amount of gas in a gas spring, and can make it unnecessary to perform suction/discharge of gas associated with a change in position of an object. Thus, the gas spring device, the balancer device and the actuator are useful. Further, the gas spring device, and the balancer device and the actuator which use the gas spring device according to the present invention are also applicable to a cushion device which adjusts a contact force and rigidity such as a manipulator besides the balancer device and the actuator.

The entire disclosure of Japanese Patent Application No. 2012-159662 filed on Jul. 18, 2012, including specification, claims, drawings, and summary are incorporated herein by reference in its entirety.

Although the present disclosure has been fully described in connection with the embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

What is claimed is:

1. A gas spring device comprising:
a gas spring that is fixed to a frame, and generates a force proportional to a differential pressure between a pressure in an inner space and an atmospheric pressure;
a suction/discharge part that is arranged in the gas spring, and is capable of adjusting an amount of gas in the inner space of the gas spring;
a rotary body that is rotatably arranged in the frame and connected to the gas spring, to which a first torque due to the force generated by the gas spring is applied;
a displacement part that is connected to the rotary body, and is displaced in conjunction with a rotary movement of the rotary body;
a speed change part that is arranged in the frame, and configured to perform one or both of conversion between a sum of the first torque and a second torque applied to the rotary body and a force applied to the displacement part by being arranged between the rotary body and the displacement part, and conversion between the generating force of the gas spring and the first torque applied to the rotary body by being arranged between the gas spring and the rotary body; and
a torque compensating part that is arranged in the frame and connected to the rotary body, and applies the second torque to the rotary body, and sets the sum of the first torque and the second torque applied to the rotary body to substantially 0 when the amount of the gas in the inner space of the gas spring is at a predetermined value.

2. The gas spring device according to claim 1, wherein the torque compensating part sets the second torque applied to the rotary body to substantially 0 when the amount of the gas in the inner space of the gas spring is an amount of the gas which brings an inner pressure to the atmospheric pressure when a volume of the inner space is set to a maximum value.

3. The gas spring device according to claim 1, wherein the torque compensating part comprises:
an elastic body that is arranged in the frame;
a first flexible coupling member that is connected to the elastic body, to which a tension generated by a generating force of the elastic body is applied;
a first non-true-circular disk that is rotatably arranged in the frame, around which the first flexible coupling member is wound; and
a first transmitting part that is rotatably arranged in the frame, and transmits to the rotary body a third torque applied to the first non-true-circular disk by the tension of the first flexible coupling member.

4. The gas spring device according to claim 3, wherein the first non-true-circular disk is configured by a rotatable plate-shaped member having a curved side surface formed of a group of a plurality of arcs each having a different radius of curvature, and the first flexible coupling member makes contact with and is wound around the curved side surface due to rotation of the plate-shaped member.

5. The gas spring device according to claim 4, wherein the first non-true-circular disk is a member having a shape in which a distance $R_c$ from a center of a rotary axis of the rotary body to a center of a thickness of the first flexible coupling member is set to $R_c=2T_c/F_c$ when a rotational angle of the rotary body is θ, $T_c$ is the second torque which the torque compensating part applies to the rotary body at the rotational angle θ, and $F_c$ is a force which is generated by the elastic body.

6. The gas spring device according to claim 1, wherein the speed change part that is arranged between the rotary body and the displacement part, comprises:
a second non-true-circular disk that is connected to the rotary body and rotates in conjunction with the rotary body; and
a second flexible coupling member that has one end thereof wound around the second non-true-circular disk and an other end thereof connected to the displacement part.

7. The gas spring device according to claim 6, wherein the second non-true-circular disk is configured by a rotatable plate-shaped member having a curved side surface formed of a group of a plurality of arcs each having a different radius of curvature, and the second flexible coupling member makes contact with is wound around the curved side surface due to rotation of the plate-shaped member.

8. The gas spring device according to claim 7, wherein
the gas spring is configured by a cylinder and a piston which moves inside the cylinder, and
the second non-true-circular disk is a member formed in a shape in which a distance R from a center of a rotary axis of the rotary body to a center of a thickness of the second flexible coupling member is set to $R=R_0/(1-R_a\theta/(2L))$ when a rotational angle of the rotary body is θ, $R_0$ is a distance from the center of the rotary axis of the rotary body to the center of the thickness of the second flexible coupling member when the rotational angle θ=0, $R_a$ is a radius of the rotary body, and L is a length of the inner space where the piston moves in the cylinder.

9. The gas spring device according to claim 1, wherein the speed change part arranged between the gas spring and the rotary body, comprises:
a third flexible coupling member that is connected to the gas spring, to which a tension due to the force generated by the gas spring is applied;
a third non-true-circular disk that is rotatably arranged in the frame, around which the third flexible coupling member is wound; and
a second transmitting part that transmits to the rotary body a fourth torque applied to the third non-true-circular disk by tension of the third flexible coupling member.

10. The gas spring device according to claim 1, wherein a force or a fifth torque taken out from the displacement part is constant regardless of a displacement or an angular displacement.

11. The gas spring device according to claim 1, wherein a force or a fifth torque taken out from the displacement part changes linearly with respect to a displacement or an angular displacement.

12. A composite gas spring device comprising:
a plurality of the gas spring devices according to claim 1 having different characteristics, wherein
the displacement part, and the speed change part arranged between the displacement part and the rotary body in the respective gas spring devices are shared by the plurality of gas spring devices.

13. A balancer device comprising:
the gas spring device according to claim 1; and
a holding part that supports an own weight of an object connected to the displacement part of the gas spring device.

14. A gas pressure actuator comprising:
the gas spring device according to claim 1; and
a control device that is connected to the suction/discharge part of the gas spring device, and changes a generating force of the gas spring device by controlling the pressure in the inner space of the gas spring.

15. A bias load compensating actuator comprising:
the gas spring device according to claim 1; and
an actuator that applies a force to the displacement part of the gas spring device in parallel.

* * * * *